United States Patent
Oehring et al.

(10) Patent No.: US 11,578,580 B2
(45) Date of Patent: *Feb. 14, 2023

(54) ELECTRIC POWERED HYDRAULIC FRACTURING PUMP SYSTEM WITH SINGLE ELECTRIC POWERED MULTI-PLUNGER PUMP FRACTURING TRAILERS, FILTRATION UNITS, AND SLIDE OUT PLATFORM

(71) Applicant: U.S. Well Services, LLC, Houston, TX (US)

(72) Inventors: Jared Oehring, Houston, TX (US); Brandon N. Hinderliter, Houston, TX (US); Lon Robinson, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/170,128

(22) Filed: Feb. 8, 2021

(65) Prior Publication Data
US 2022/0018232 A1 Jan. 20, 2022

Related U.S. Application Data

(63) Continuation of application No. 16/597,008, filed on Oct. 9, 2019, now Pat. No. 10,914,155.
(Continued)

(51) Int. Cl.
*E21B 43/26* (2006.01)
*F04B 1/00* (2020.01)
(Continued)

(52) U.S. Cl.
CPC .......... *E21B 43/2607* (2020.05); *B01D 39/14* (2013.01); *B01D 46/003* (2013.01);
(Continued)

(58) Field of Classification Search
CPC ..... E21B 43/2607; E21B 43/26; B01D 39/14; B01D 43/003; B01D 2279/40; F04B 1/00;
(Continued)

(56) References Cited

U.S. PATENT DOCUMENTS

| | | | | |
|---|---|---|---|---|
| 1,656,861 | A | * | 1/1928 | Leonard .................. E21B 15/00 52/223.4 |
| 2,976,025 | A | | 3/1961 | Pro |

(Continued)

FOREIGN PATENT DOCUMENTS

| | | |
|---|---|---|
| CN | 104117308 A | 10/2014 |
| CN | 104196613 A | 12/2014 |

(Continued)

OTHER PUBLICATIONS

Non-Final Office Action issued in U.S. Appl. No. 16/871,928 dated Aug. 25, 2021.
(Continued)

*Primary Examiner* — Brad Harcourt
(74) *Attorney, Agent, or Firm* — Hogan Lovells US LLP

(57) ABSTRACT

A hydraulic fracturing system for fracturing a subterranean formation includes a support structure that includes an electric powered pump, arranged in a first area, the electric powered pump powered by at least one electric motor, also arranged in the first area. The system further includes a variable frequency drive (VFD), arranged in a second area proximate the first area, connected to the at least one electric motor to control the speed of the at least one electric motor. The system includes a transformer, arranged in a third area proximate the second area. The system also includes a slide out platform integrated into the first area, the slide out platform being driven between a retracted position and a deployed position.

4 Claims, 21 Drawing Sheets

Related U.S. Application Data

(60) Provisional application No. 62/791,458, filed on Jan. 11, 2019, provisional application No. 62/791,064, filed on Jan. 11, 2019, provisional application No. 62/743,360, filed on Oct. 9, 2018, provisional application No. 62/743,299, filed on Oct. 9, 2018.

(51) Int. Cl.
*F04B 15/02* (2006.01)
*F04B 17/03* (2006.01)
*B01D 39/14* (2006.01)
*B01D 46/00* (2022.01)
*H01F 38/14* (2006.01)
*H02P 7/00* (2016.01)

(52) U.S. Cl.
CPC ............... *E21B 43/26* (2013.01); *F04B 1/00* (2013.01); *F04B 15/02* (2013.01); *F04B 17/03* (2013.01); *H01F 38/14* (2013.01); *B01D 2279/40* (2013.01); *H02P 7/00* (2013.01)

(58) Field of Classification Search
CPC .......... F04B 15/02; F04B 17/03; F04B 23/06; H02P 7/00; H01F 38/14
See application file for complete search history.

(56) References Cited

U.S. PATENT DOCUMENTS

| | | | |
|---|---|---|---|
| 3,878,884 A | 4/1975 | Raleigh | |
| 4,411,313 A | 10/1983 | Johnson et al. | |
| 4,538,916 A | 9/1985 | Zimmerman | |
| 4,601,629 A | 7/1986 | Zimmerman | |
| 4,768,884 A | 9/1988 | Elkin | |
| 5,114,239 A | 5/1992 | Allen | |
| 5,334,899 A | 8/1994 | Skybyk | |
| 5,439,066 A | 8/1995 | Gipson | |
| 5,486,047 A | 1/1996 | Zimmerman | |
| 5,758,918 A † | 6/1998 | Schneider | |
| 5,798,596 A | 8/1998 | Lordo | |
| 5,813,455 A | 9/1998 | Pratt et al. | |
| 5,950,726 A | 9/1999 | Roberts | |
| 6,035,265 A | 3/2000 | Dister et al. | |
| 6,097,310 A | 8/2000 | Harrell et al. | |
| 6,121,705 A | 9/2000 | Hoong | |
| 6,273,193 B1 | 8/2001 | Hermann et al. | |
| 6,442,942 B1 | 9/2002 | Kopko | |
| 6,585,455 B1 | 7/2003 | Petersen et al. | |
| 6,788,022 B2 | 9/2004 | Sopko | |
| 6,985,750 B1 | 1/2006 | Vicknair et al. | |
| 7,795,830 B2 | 9/2010 | Johnson | |
| 9,062,545 B2 | 6/2015 | Roberts et al. | |
| 9,140,105 B2 | 9/2015 | Pattillo | |
| 9,353,593 B1 | 5/2016 | Lu et al. | |
| 9,506,333 B2 | 11/2016 | Castillo et al. | |
| 9,790,858 B2 | 10/2017 | Kanebako | |
| 9,945,365 B2 | 4/2018 | Hernandez et al. | |
| 9,963,961 B2 † | 5/2018 | Hardin | |
| 10,221,639 B2 | 3/2019 | Romer et al. | |
| 10,408,030 B2 | 9/2019 | Oehring et al. | |
| 10,408,031 B2 | 9/2019 | Oehring et al. | |
| 10,415,332 B2 | 9/2019 | Morris et al. | |
| 10,648,270 B2 | 5/2020 | Brunty et al. | |
| 10,648,311 B2 | 5/2020 | Oehring et al. | |
| 10,686,301 B2 | 6/2020 | Oehring et al. | |
| 10,731,561 B2 | 8/2020 | Oehring et al. | |
| 10,740,730 B2 | 8/2020 | Altamirano et al. | |
| 10,767,561 B2 | 9/2020 | Brady | |
| 10,781,752 B2 | 9/2020 | Kikkawa et al. | |
| 10,794,165 B2 | 10/2020 | Fischer et al. | |
| 10,988,998 B2 | 4/2021 | Fischer et al. | |
| 2001/0000996 A1 | 5/2001 | Grimland et al. | |
| 2004/0045703 A1 | 3/2004 | Hooper et al. | |
| 2005/0201197 A1 | 9/2005 | Duell et al. | |
| 2006/0109141 A1 | 5/2006 | Huang | |
| 2008/0017369 A1* | 1/2008 | Sarada | E21B 43/40 166/266 |
| 2008/0164023 A1 | 7/2008 | Dykstra et al. | |
| 2008/0257449 A1 | 10/2008 | Weinstein et al. | |
| 2008/0277120 A1 | 11/2008 | Hickie | |
| 2009/0072645 A1 | 3/2009 | Quere | |
| 2011/0081268 A1 | 4/2011 | Ochoa et al. | |
| 2011/0110793 A1 | 5/2011 | Leugemores et al. | |
| 2012/0063936 A1 | 3/2012 | Baxter et al. | |
| 2012/0112757 A1 | 5/2012 | Vrankovic et al. | |
| 2012/0150455 A1 | 6/2012 | Franklin et al. | |
| 2013/0051971 A1 | 2/2013 | Wyse et al. | |
| 2013/0284455 A1 | 10/2013 | Kajaria et al. | |
| 2014/0174717 A1 | 6/2014 | Broussard et al. | |
| 2015/0147194 A1 | 5/2015 | Foote | |
| 2015/0233530 A1 | 8/2015 | Sandidge | |
| 2016/0006311 A1 | 1/2016 | Li | |
| 2016/0230660 A1 | 8/2016 | Zeitoun et al. | |
| 2016/0326853 A1 | 11/2016 | Fred et al. | |
| 2017/0030177 A1* | 2/2017 | Oehring | E21B 7/02 |
| 2017/0036872 A1* | 2/2017 | Wallace | B60R 5/041 |
| 2017/0082033 A1 | 3/2017 | Wu et al. | |
| 2017/0096889 A1 | 4/2017 | Blanckaert et al. | |
| 2017/0145918 A1 † | 5/2017 | Oehring et al. | |
| 2017/0204852 A1 | 7/2017 | Barnett | |
| 2017/0212535 A1 | 7/2017 | Shelman et al. | |
| 2017/0370639 A1 | 12/2017 | Barden et al. | |
| 2018/0090914 A1 | 3/2018 | Johnson et al. | |
| 2018/0181830 A1 | 6/2018 | Luharuka et al. | |
| 2018/0259080 A1 | 9/2018 | Dale et al. | |
| 2018/0266217 A1 | 9/2018 | Funkhauser et al. | |
| 2018/0284817 A1 | 10/2018 | Cook et al. | |
| 2018/0298731 A1 | 10/2018 | Bishop | |
| 2018/0312738 A1 | 11/2018 | Rutsch et al. | |
| 2018/0313677 A1 | 11/2018 | Warren et al. | |
| 2018/0363437 A1* | 12/2018 | Coli | F04B 19/22 |
| 2018/0363640 A1 | 12/2018 | Kajita et al. | |
| 2018/0366950 A1 | 12/2018 | Pedersen et al. | |
| 2019/0040727 A1 | 2/2019 | Oehring et al. | |
| 2019/0128104 A1 | 5/2019 | Graham et al. | |
| 2019/0145251 A1 | 5/2019 | Johnson | |
| 2019/0154020 A1 | 5/2019 | Glass | |
| 2019/0249527 A1 | 8/2019 | Kraynek | |
| 2019/0257462 A1 | 8/2019 | Rogers | |
| 2020/0040878 A1 | 2/2020 | Morris | |
| 2020/0325760 A1 | 10/2020 | Markham | |
| 2020/0350790 A1 | 11/2020 | Luft et al. | |

FOREIGN PATENT DOCUMENTS

| | | |
|---|---|---|
| CN | 112196508 A | 1/2021 |
| WO | 2009046280 | 4/2009 |
| WO | 2014177346 | 11/2014 |
| WO | 2018044307 A1 | 3/2018 |
| WO | 2018213925 A1 | 11/2018 |
| WO | 2019210417 | 11/2019 |

OTHER PUBLICATIONS

Non-Final Office Action issued in U.S. Appl. No. 16/943,727 dated Aug. 3, 2021.
Non-Final Office Action issued in U.S. Appl. No. 14/881,525 dated Jul. 21, 2021.
Non-Final Office Action issued in U.S. Appl. No. 16/404,283 dated Jul. 21, 2021.
Notice of Allowance and Notice of Allowability issued in U.S. Appl. No. 15/829,419 dated Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.
Kroposki et al., Making Microgrids Work, 6 IEEE Power and Energy Mag. 40, 41 (2008).
Dan T. Ton & Merrill A. Smith, The U.S Department of Energy's Microgrid Initiative, 25 The Electricity J. 84 (2012), pp. 84-94.
Non-Final Office Action issued in U.S. Appl. No. 16/871,328 dated Dec. 9, 2021.

(56) References Cited

OTHER PUBLICATIONS

Non-Final Office Action issued in U.S. Appl. No. 16/943,935 dated Oct. 21, 2021.
Non-Final Office Action issued in U.S. Appl. No. 16/564,186, dated Oct. 15, 2021.
Final Office Action issued in U.S. Appl. No. 16/356,263 dated Oct. 7, 2021.
Non-Final Office Action issued in U.S. Appl. No. 17/060,647 dated Sep. 20, 2021.
Non-Final Office Action issued in U.S. Appl. No. 16/901,774 dated Sep. 14, 2021.
Canadian Office Action issued in Canadian Application No. 3,094,768 dated Oct. 28, 2021.
International Search Report and Written Opinion mailed in PCT/US20/67526 dated May 6, 2021.
International Search Report and Written Opinion mailed in PCT/US20/67608 dated Mar. 30, 2021.
International Search Report and Written Opinion mailed in PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.
International Search Report and Written Opinion mailed in PCT/US2020/066543 dated May 11, 2021.
Morris et al., U.S. Appl. No. 62/526,869; Hydration-Blender Transport and Electric Power Distribution for Fracturing Operation; Jun. 28, 2018; USPTO; see entire document.
Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.

\* cited by examiner
† cited by third party

ELECTRIC POWERED HYDRAULIC FRACTURING PUMP SYSTEM WITH SINGLE ELECTRIC POWERED MULTI-PLUNGER PUMP FRACTURING TRAILERS, FILTRATION UNITS, AND SLIDE OUT PLATFORM

CROSS REFERENCE TO RELATED APPLICATIONS

This application is a continuation of U.S. application Ser. No. 16/597,008, filed Oct. 9, 2019, titled "Electric Powered Hydraulic Fracturing Pump System with Single Electric Powered Multi-Plunger Pump Fracturing Trailers, Filtration Units, and Slide Out Platform," now U.S. Pat. No. 10,914,155 issued Feb. 9, 2021, which claims priority to and the benefit of U.S. Provisional Application Ser. No. 62/743,360 filed Oct. 9, 2018, titled "Electric Powered Hydraulic Fracturing Pump System with Single Electric Quintuplex Fracturing Trailers," and U.S. Provisional Application Ser. No. 62/743,299 filed Oct. 9, 2018 titled "MODULAR SWITCHGEAR SYSTEM AND POWER DISTRIBUTION FOR ELECTRIC OILFIELD EQUIPMENT," and U.S. Provisional Application Ser. No. 62/791,458 filed Jan. 11, 2019 titled "Natural Gas Fueling System for Electric Powered Hydraulic Fracturing Fleets," and U.S. Provisional Application Ser. No. 62/791,064 filed Jan. 11, 2019 titled "Electric Powered Slide Out Platform for Hydraulic Fracturing Unit," the full disclosures of which are hereby incorporated herein by reference in their entirety for all purposes.

BACKGROUND

1. Technical Field

This disclosure relates generally to hydraulic fracturing and more particularly to systems and methods for module switchgear and power distribution systems.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

Usually in fracturing systems the fracturing equipment runs on diesel-generated mechanical power or by other internal combustion engines. Such engines may be very powerful, but have certain disadvantages. Diesel is more expensive, is less environmentally friendly, less safe, and heavier to transport than natural gas. For example, heavy diesel engines may require the use of a large amount of heavy equipment, including trailers and trucks, to transport the engines to and from a wellsite. In addition, such engines are not clean, generating large amounts of exhaust and pollutants that may cause environmental hazards, and are extremely loud, among other problems. Onsite refueling, especially during operations, presents increased risks of fuel leaks, fires, and other accidents. The large amounts of diesel fuel needed to power traditional fracturing operations requires constant transportation and delivery by diesel tankers onto the well site, resulting in significant carbon dioxide emissions.

Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems. Turbine use is well known as a power source, but is not typically employed for powering fracturing operations.

Though less expensive to operate, safer, and more environmentally friendly, turbine generators come with their own limitations and difficulties as well. As is well known, turbines generally operate more efficiently at higher loads. Many power plants or industrial plants steadily operate turbines at 98% to 99% of their maximum potential to achieve the greatest efficiency and maintain this level of use without significant difficulty. This is due in part to these plants having a steady power demand that either does not fluctuate (i.e., constant power demand), or having sufficient warning if a load will change (e.g., when shutting down or starting up a factory process).

During fracturing operations, there may be a variety of cables, hoses, and the like extending across various locations at the well site. This may generate traffic or congestion, as routes and passages around the well site may be restricted or blocked off. Furthermore, operators may be confused when connecting or disconnecting equipment, as the large number of hoses, cables, and the like may be challenging to hook up to desired locations. Moreover, because space at the well site is at a premium, having numerous skids, trailers, and the like may present logistical challenges.

Therefore it may be desirable to devise a means by which turbine power generation can be managed at an output usable by fracturing equipment.

SUMMARY

Applicant recognized the problems noted above herein and conceived and developed embodiments of systems and methods, according to the present disclosure, for operating electric fracturing pumps.

Hydraulic Fracturing is a technique used to stimulate production from some hydrocarbon producing wells. The technique usually involves injecting fluid into a wellbore at a pressure sufficient to generate fissures in the formation surrounding the wellbore. Typically, the pressurized fluid is injected into a portion of the wellbore that is pressure isolated from the remaining length of the wellbore so that fracturing is limited to a designated portion of the formation. The fracturing fluid slurry, whose primary component is usually water, includes proppant (such as sand or ceramic) that migrate into the fractures with the fracturing fluid slurry and remain to prop open the fractures after pressure is no longer applied to the wellbore.

In order to fracture a formation, the hydraulic fracturing fluid must be pumped into the formation at very high pressures. This is typically accomplished using powerful pumps, known as hydraulic fracturing pumps. In the past, such pumps have been powered have been powered by large, dirty, engines, such as diesel engines. According to the present technology, however, Applicant has developed a system whereby the hydraulic fracturing pumps and other equipment necessary or useful to the operation can be powered by electric motors.

Because of the pressures required in hydraulic fracturing operations, the motors that power the pumps must be powerful, and appropriate safety and other considerations must be accounted for through the use of certain equipment such as variable frequency drives, and transformers. Certain embodiments of the present technology contemplate that such equipment can be contained together, on a single trailer, or consolidated into a few trailers.

The present technology provides numerous advantages over known, and in particular non-electric, hydraulic fracturing systems. For example, embodiments of the present disclosure provide improved mobility by positioning transformer on the pump trailer, which may be shared with other components of the system, such as pumps and/or motors, among other components. In other words the transformer can sit on the same platform (e.g., trailer, skid, body load) as the variable frequency drive (VFD), motor control center, and frac pump. This allows a single high voltage cable, such as 13.8 kV, to run from the switchgear to the pumping unit. As a result, the mobilization and demobilization is simplified, which reduces costs. Moreover, there may be fewer cables running along the well site, which reduces a potential hazard.

Embodiments of the present disclosure may include one or more additional improvements over traditional systems, including but not limited to: plunger type fracturing pumps that could have up to 15 plungers, liquid cooling for a variable frequency drive (VFD) system, ladders and handrails on a gooseneck of the trailer platform so that electricians can safely connect components directly to transformers, a roller system on the gooseneck of the trailer to allow electricians to smoothly pull cables onto the gooseneck without damaging the cables; a VFD liquid cooling system on the gooseneck of the electric powered pump trailer; a motor control center on the gooseneck of the trailer with ladders and handrails to allow easy maintenance; a VFD installed on the trailer; a VFD and human machine interface (HMI) screen on the same service platform to allow for maintenance to work on the VFD and oversee pump controls from the same physical location; a rain guard to protect equipment and personnel conducting VFD and HMI maintenance, and various other features that may be synergistically incorporated within a common trailer. However, it should be appreciated that while various embodiments may describe a common trailer for each component, in various embodiments systems and methods may include multiple trailers that may be arranged proximate one another. Furthermore, discussions of a trailer are for illustrative purposes only and embodiments may further be deployed on skids, platforms, truck beds, flat beds, and the like.

In an embodiment, a hydraulic fracturing system for fracturing a subterranean formation includes a support structure having a first area, a second area, a third area, and a fourth area arranged adjacent one another. In various embodiments, the first, second, third, and fourth areas may be axially aligned along an axis of support structure. Moreover, the first, second, third, and fourth areas may refer to sections of the support structure. The system also includes an electric powered, multi-plunger pump, arranged in the first area, the electric powered pump coupled to a well associated with the subterranean formation and powered by at least one electric motor, also arranged in the first area, the electric powered pump configured to pump fluid into a wellbore associated with the well at a high pressure so that the fluid passes from the wellbore into the subterranean formation and fractures the subterranean formation. The system includes a variable frequency drive (VFD), arranged in the second area proximate the first area, connected to the at least one electric motor to control the speed of the at least one electric motor. The system also includes a transformer, arranged in the third area proximate the second area, the transformer positioned within an enclosure, the transformer distributing power to the electric powered pump, the power being received from at least one generator at a voltage higher than an operating voltage of the electric powered pump. The system further includes a slide out platform integrated into the first area, the slide out platform being driven between a retracted position and a deployed position, wherein the deployed position provides a work area proximate the electric powered pump extending outward from the electric powered pump.

In an embodiment, a hydraulic fracturing system for fracturing a subterranean formation includes at least one generator and at least one switchgear receiving electrical power from the generator. The system also includes an electric powered pump, arranged on a support structure, the electric powered pump coupled to a well associated with the subterranean formation and powered by at least one electric motor, the electric pump configured to pump fluid into a wellbore associated with the well at a high pressure so that the fluid passes from the wellbore into the subterranean formation and fractures the subterranean formation. The system further includes a variable frequency drive (VFD), arranged on the support structure, connected to the at least one electric motor to control the speed of the at least one electric motor. The system includes a transformer, arranged on the support structure, distributing power to the electric powered pump, the power being received from the least one generator at a voltage higher than an operating voltage of the electric powered pump. The system also includes an electrically controlled slide out platform, arranged on the support structure, the slide out platform being driven between a retracted position and a deployed position, wherein the deployed position provides a work area proximate the electric powered pump extending outward from the electric powered pump substantially perpendicular to a longitudinal axis of the support structure, the platform being at least partially coupled to a pump platform supporting the electric powered pump.

In an embodiment, an electrically driven slide out platform coupled to a trailer including one or more components for hydraulic fracturing includes an actuator for driving movement of the platform between a retracted position and a deployed position, the actuator being coupled to a lower area of a standing portion of the platform. The platform also includes a pair of guide rails, coupled to the platform, the guiderails extending perpendicular to an axis of the trailer and engaging at least a portion of a pump platform. The platform further includes brackets, supporting the guide rails. The platform also includes a plurality of wheels engaging the guide rails, the wheels restricting movement of the guide rails in at least two directions.

BRIEF DESCRIPTION OF DRAWINGS

Some of the features and benefits of the present disclosure having been stated, others will become apparent as the description proceeds when taken in conjunction with the accompanying drawings, in which.

Figure 1:
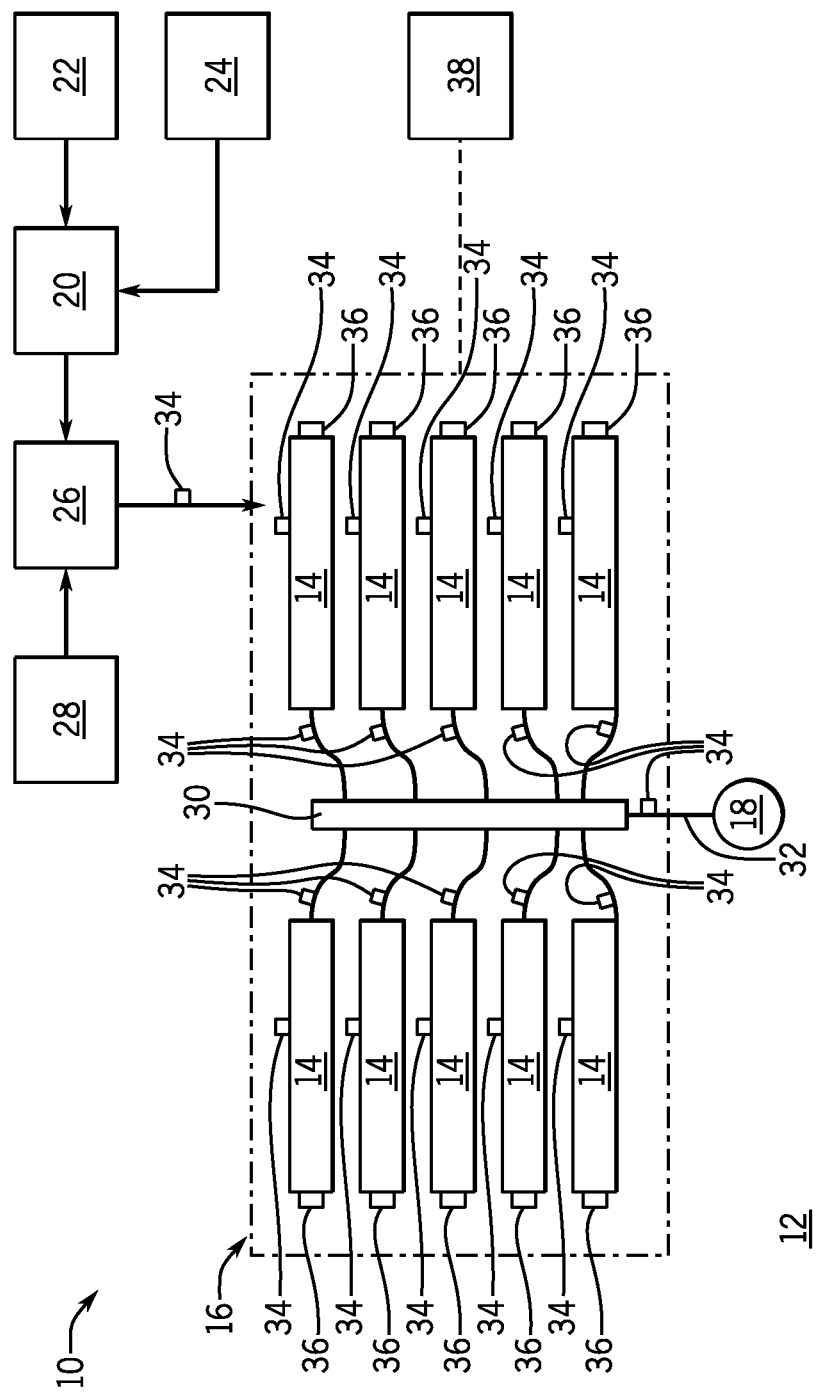
FIG. 1 is a schematic plan view of an embodiment of a fracturing operation, in accordance with embodiments of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise.

FIG. 1 is a plan schematic view of an embodiment of a hydraulic fracturing system 10 positioned at a well site 12.

In the illustrated embodiment, pump trucks 14, which make up a pumping system 16, are used to pressurize a slurry solution for injection into a wellhead 18. An optional hydration unit 20 receives fluid from a fluid source 22 via a line, such as a tubular, and also receives additives from an additive source 24. In an embodiment, the fluid is water and the additives are mixed together and transferred to a blender unit 26 where proppant from a proppant source 28 may be added to form the slurry solution (e.g., fracturing slurry) which is transferred to the pumping system 16. The pump trucks 14 may receive the slurry solution at a first pressure (e.g., 80 psi to 160 psi) and boost the pressure to around 15,000 psi for injection into the wellhead 18. In certain embodiments, the pump units 14 are powered by electric motors.

After being discharged from the pump system 16, a distribution system 30, such as a missile, receives the slurry solution for injection into the wellhead 18. The distribution system 30 consolidates the slurry solution from each of the pump units 14 and includes discharge piping 32 coupled to the wellhead 18. In this manner, pressurized solution for hydraulic fracturing may be injected into the wellhead 18.

In the illustrated embodiment, one or more sensors 34, 36 are arranged throughout the hydraulic fracturing system 10 to measure various properties related to fluid flow, vibration, and the like.

It should be appreciated that while various embodiments of the present disclosure may describe electric motors powering the pump units 14, in embodiments, electrical generation can be supplied by various different options, as well as hybrid options. Hybrid options may include two or more of the following electric generation options: Gas turbine generators with fuel supplied by field gas, CNG, and/or LNG, diesel turbine generators, diesel engine generators, natural gas engine generators, batteries, electrical grids, and the like. Moreover, these electric sources may include a single source type unit or multiple units. For example, there may be one gas turbine generator, two gas turbines generators, two gas turbine generators coupled with one diesel engine generator, and various other configurations.

In various embodiments, equipment at the well site may utilize 3 phase, 60 Hz, 690V electrical power. However, it should be appreciated that in other embodiments different power specifications may be utilized, such as 4160V or at different frequencies, such as 50 Hz. Accordingly, discussions herein with a particular type of power specification should not be interpreted as limited only the particularly discussed specification unless otherwise explicitly stated. Furthermore, systems described herein are designed for use in outdoor, oilfield conditions with fluctuations in temperature and weather, such as intense sunlight, wind, rain, snow, dust, and the like. In embodiments, the components are designed in accordance with various industry standards, such as NEMA, ANSI, and NFPA.

Figure 2:
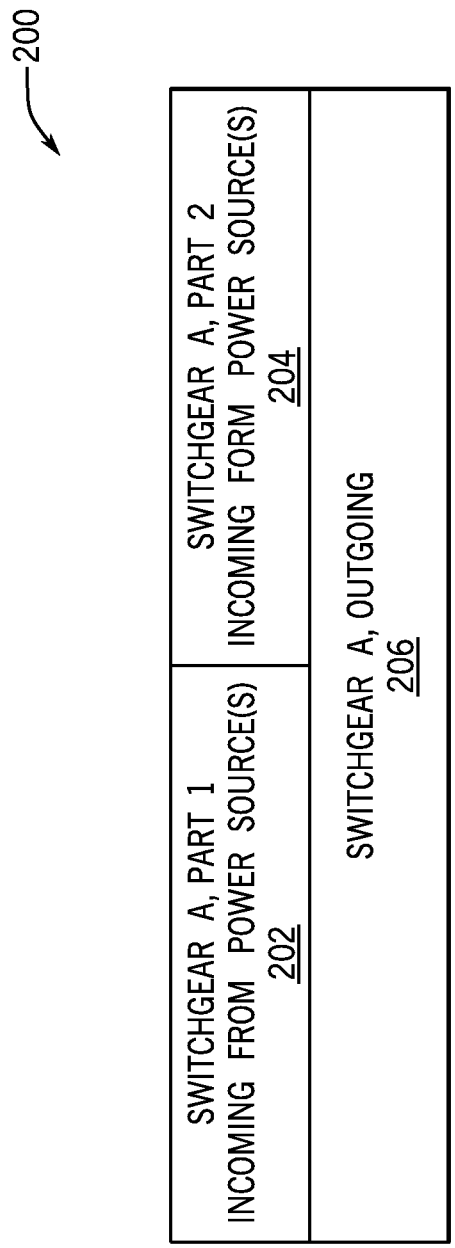
FIG. 2 is a block diagram of an embodiment of a switchgear unit, in accordance with embodiments of the present disclosure.

FIG. 2 is a block diagram of an embodiment of a switchgear unit 200 that includes a first part 202, a second part 204, and a third part 206. As illustrated, the first part 202 and the second part 204 may receive incoming power from one or more power sources. These power sources may include any of the power sources described above, such as gas turbines, diesel generators, and the like. The switchgear unit 200 also includes the third part 206, which is utilized to output energy to various pieces of equipment at the wellsite.

Embodiments of the present disclosure include the switchgear unit 200 configured to enable capability for a variety of configurations. A non-limiting example includes: one 30 MW, 60 hz, 13,800 VAC natural gas turbine generator; one 30 MW, 60 hz, 13,800 VAC natural gas generator and one 5.67 MW, 60 hz, 13,800 VAC natural gas turbine generator; one 30 MW, 60 hz, 13,800 VAC natural gas turbine generator and two 5.67 MW, 60 hz, 13,800 VAC natural gas turbine generators; one 5.67 MW, 60 hz, 13,800 VAC natural gas turbine generator; two 5.67 MW, 60 hz, 13,800 VAC natural gas turbine generators; three 5.67 MW, 60 hz, 13,800 VAC natural gas turbine generators; four 5.67 MW, 60 hz, 13,800 VAC natural gas turbine generators; and two 30 MW, 60 hz, 13,800 VAC natural gas turbine generators.

As noted above, a variety of different configurations may be utilized along with the switchgear unit in order to provide operational power at the well site. For example, the first part 202 may be configured to receive one or more options from the list including, but not limited to: one 30 MW generator, one 5.67 MW generator, two 5.67 MW generators, or a blank (null-no input). Similarly, in embodiments, the second part 204 may be configured to receive one or more options from the list including, but not limited to: one 30 MW generator, one 5.67 MW generator, two 5.67 MW generators, or a blank (null-no input). It should be appreciated that the first and second parts 202, 204 may be differently configured in various embodiments, such as one including the 30 MW generator input while the other includes the 5.67 MW generator input, by way of non-limiting example.

The third part 206 may be referred to as the outgoing side of the switchgear unit 200 and can connect electrically to a variety of equipment types, such as power distribution systems to transmit power long distances (e.g., 2 miles or farther); other switchgears; transformers; and the like.

In various embodiments, the switchgear unit 200 can be trailer mounted, skid mounted, bodyload mounted, or mounted on another type of platform. Furthermore, the switchgear unit 200 can be separate or combined with other equipment described herein, such as the pump trucks.

Figure 3:
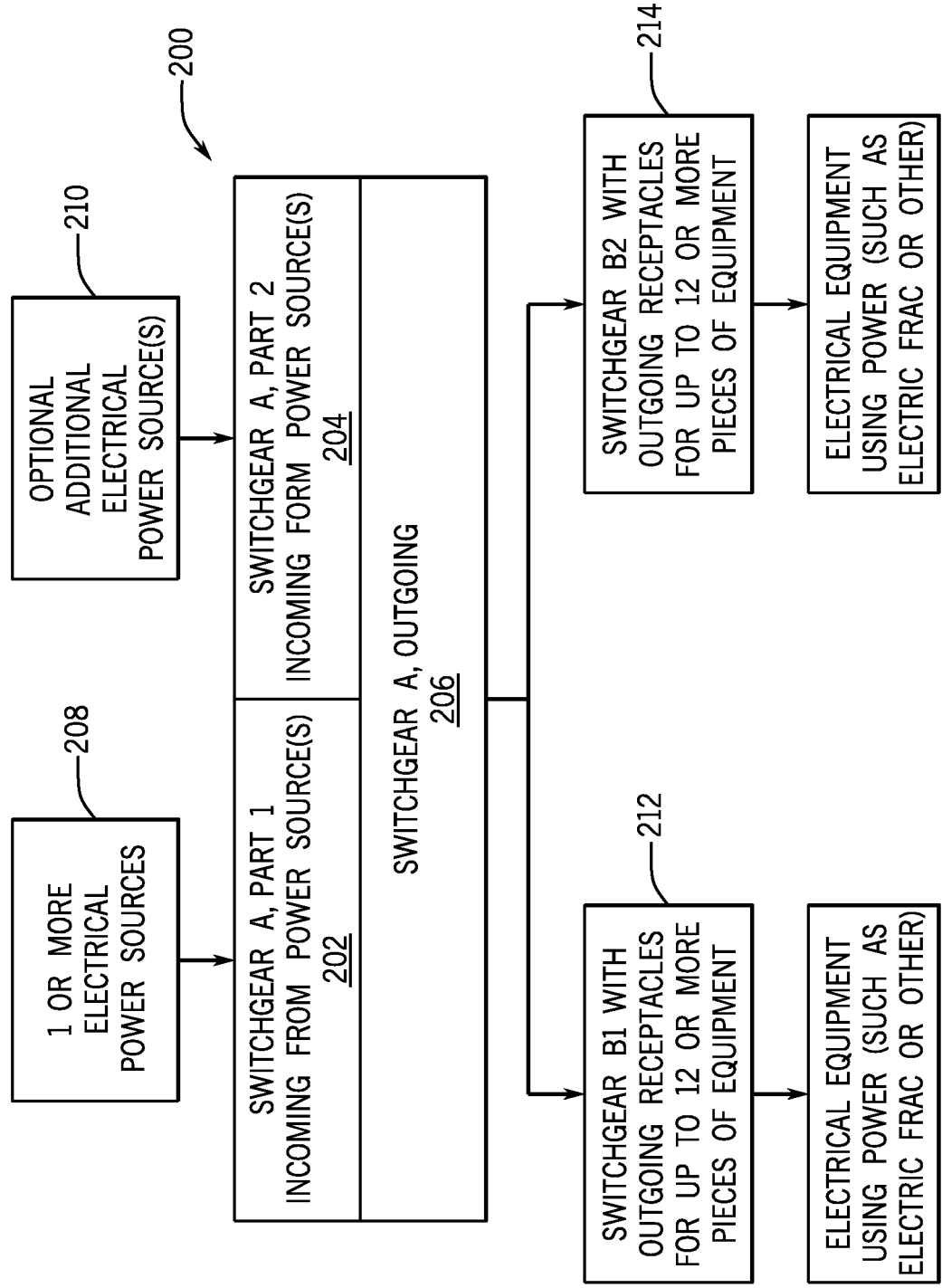
FIG. 3 is a block diagram of an embodiment of a switchgear system, in accordance with embodiments of the present disclosure.

FIG. 3 is a block diagram of an embodiment of a configuration of the switchgear unit 200. In the illustrated embodiment, power sources 208, 210 are coupled to the first part 202 and the second part 204, respectively. It should be appreciated that while a single block is illustrated, in embodiments the power sources 208, 210 may include one or more different or similar types of power generation equipment. For example, multiple different power sources may be coupled to a single switchgear part 202, 204. The third part 206 is illustrated as routing power to a first switch gear 212 and a second switchgear 214. However, it should be appreciated that, in various embodiments, the third part 206 may transmit power to other types of equipment. The illustrated first and second switchgears 212, 214 thereafter transmit power to electrical equipment, such as electric pumps, wireline, and the like. The first and second switchgears 212, 214 each include twelve (12) outlets in the illustrated embodiment, however it should be appreciated that more or fewer outlets may be utilized. Furthermore, not all outlets may be used at one time.

In embodiments, the switchgear unit 200, along with the first and second switchgears 212, 214 may be referred to as a switchgear system and may be trailer mounted. The system may be combined into a single unit or broken out into multiple units, such as in FIG. 3. Components can also be combined with other blocks such as combining switchgear functions onto an electrical power source such as a turbine generator as long as they are in electrical communication with each other. In this embodiment, switchgear unit 200 and the first and second switchgears 212, 214 are in electrical communication using power cables.

In various embodiments, the illustrated switchgear system is utilized for 13.8 kV operating voltages and includes, by way of example only, vacuum circuit breakers designed in accordance with ANSI and IEEE standards for metal enclosed switchgear rated as follows: Maximum voltage (RMS): 13.9 kV; ANSI Rating Basis: MVA rated; Operating Voltage 13.8 kV; Short Circuit Current Rating: 25 KA; Close voltage: 125 VDC; and Trip Voltage: 125 VDC.

The vertical section(s) of switchgear, may include the following common features: outdoor, non-walk-in enclosure, steel; basic ONE high construction; hinged front compartment doors with custom punching; 1200 A main bus, silver plated copper, 3 phase, 3 wire; flame retardant and track resistant bus insulation system; molded insulation cover boots at bus joints with removable non-metallic hardware; ground bus, ¼×2, tin plated copper; enclosure space heater with expanded metal cage, rate 240 VAC; powered coat paint finish; and ANSI-61, light gray interior and exterior. Moreover, in embodiments, one or more switchgears described with embodiments of the present disclosure may be rated for a 3000 A bus.

In embodiments, the system may include main bus voltage monitoring. Moreover, the system may include AC control power equipment that includes, by way of example: circuit breaker cell rated 200 A; silver plated copper runback bus assembly rated 200 A; fixed mount vacuum circuit breaker rated 600 A, 13.8 kV, 25 KA; digital overcurrent protective relay; fixed mounted assembly; secondary molded case circuit breaker; fixed mounted CPT, 15 kVA, 13800-208/120V, three phased with required primary fuses;

In embodiments, the system also includes main Circuit breakers, with each set including: circuit breaker cell rated 600 A; silver plated copper runback bus assembly rated 600 A; fixed mounted circuit breaker rated 600 A, 13.8 kV, 25 KA (Mains); digital overcurrent protective relay; lock-out relay; pilot lights, red, green, and amber; and incoming line Earthing Switch.

In various embodiments, each switchgear trailer also contains platform decking and handrails meeting OSHA safety standards, mounted on the gooseneck of the trailer.

The combined overall switchgear package for the entire spread may distribute electrical power between the following example list of hydraulic fracturing equipment: 22 electric powered hydraulic fracturing pumps with a transformer (it should be appreciated that 22 is for example purposes only and more or fewer pumps may be included), 2500 kVA, (13,800 V primary to 690 V secondary) and one 3000 HP AC Motor. Other embodiments of the electric powered hydraulic fracturing pumps can include dual hydraulic fracturing pumps (more than one pump, one or more motors), intensifier pumps, and other forms of pumping frac slurry into a well that require electrical power. A non-limiting example of equipment includes electric pump down pumps; wire line; lights for the site; water transfer pump; electric crane; auxiliary power; electric blender; electric data van; electric hydration; electric chemical add; electric dry chem add; electric sand equipment; electric dust/silica mitigation equipment; black start generators; gas compressors; and filtration systems.

In various embodiments, a single electric powered multi-plunger pump fracturing trailer is capable of pumping inhibited acid and other proppant laden stimulation fluids and is remotely operated from a control unit. The multi-plunger pump may refer to pumps having two plungers, three plungers, four plungers, five plungers, six plungers, seven plungers, eight plungers, or any reasonable number of plungers may be odd (e.g., 5, 7, 9, 11) or even (e.g., 2, 4, 6, 8, 10, 12, 14) and that the number of plungers may be varied, along with various different stroke lengths associated with the number of plungers. In various embodiments, having an odd number of plungers may reduce kinematic flow ripple. By way of example only, the pumps may include stroke lengths of 4.5 inches, 5 inches, 8 inches, 10 inches, or any other reasonable stroke length. It should be appreciated that the greater the number of plungers the fewer overall pumps may be included to produce the same output. The single electric motor is capable of delivering 3,000 BHP or approximately 2500 HHP based on efficiency losses, pump limitations, and varying conditions at time of operations. While delivering full horsepower without exceeding the pump ratings, components will not vibrate with excessive amplitudes (e.g., amplitudes above a threshold) in resonance with the forcing vibrations of the electric motor or pump. Also, there are no or substantially no excessive rotational vibrations (e.g., vibrations above a threshold) of electric motor or pump due to transmitted torque and the flexibility of the trailer and mounting systems. The VFD system is installed on the trailer in various embodiments illustrated herein. The unit is capable of operating during prolonged pumping operations. The unit may operate in temperature ranges of −40° C. to 55° C.

Referring to the drawings, there is shown an electric fracturing trailer that is capable of pumping inhibited acid and other proppant laden stimulation fluids into a well, and that is remotely operated from a control unit. The electric motor is capable of delivering up to 3,000 brake horsepower (BHP) or approximately 2,500 hydraulic horsepower (HHP) based on efficiency losses, pump limitations, and varying conditions at the time of operations.

According to some embodiments, while delivering full horsepower without exceeding the pump ratings, there are no components that will vibrate with excessive amplitudes in resonance with the forcing vibrations of the electric motor or pump. Also, due to transmitted torque and the flexibility of the trailer and mounting systems, there are excessive rotational vibrations of the electric motor or pump are reduced or eliminated. In some embodiments, the unit can be capable of operating during prolonged pumping operations. As noted above, the unit can typically be capable of operating in temperature ranges of about minus forty degrees Celcius (−40° C.) to about fifty five degrees Celcius (55° C.).

Figure 4:
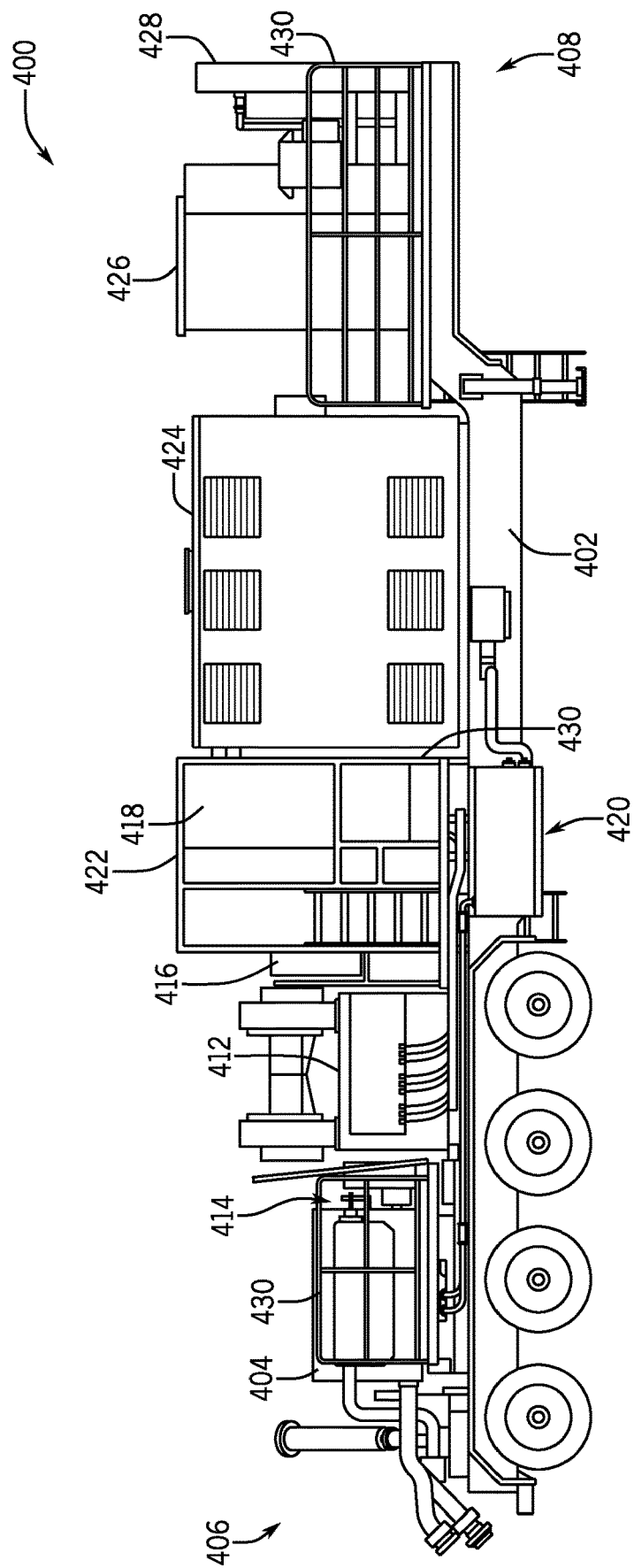
FIG. 4 is a side elevational view of an embodiment of a pumping trailer, in accordance with embodiments of the present disclosure.

FIG. 4 illustrates a side elevational view of an embodiment of a pumping trailer 400 for use at hydraulic fracturing sites. As will be described below, the side view of the unit includes a pump, slide out platform for service of the multi-plunger pump, a motor, motor blowers, a coupling, a human machine interface, a variable frequency drive, a platform with a rain cover, a transformer, a service platform for the transformer, a motor control center, a cooling system, and rollers on a gooseneck for cables. The illustrated pumping trailer 400 includes a trailer 402, which is a gooseneck trailer in the illustrated embodiment. In various embodiments, the trailer 402 is a heavy-duty single drop trailer that includes heavy-duty twin beam construction; 52" king pin setting; landing legs rated for 160,000 lbs; air ride suspension; heady-duty tri or quad axle configuration; ABS brakes, air type; 11.00 R 22.5 radial tires; 2" SAE king pin with rub plate; light mounted stop/turn clearance; mud flaps; rear bumper with tow hook; running lights for highway use; front and rear fenders; and the like.

As illustrated, in various embodiments, the trailer 402 is sized to accommodate a variety of different pieces of equipment. Advantageously, mounting the equipment to a single trailer 402 facilitates mobilization and demobilization between well sites. Moreover, the configuration may enable hard-piping or coupling various pieces of equipment before arriving at the well site, thereby reducing time. Additionally, the configuration illustrated in FIG. 4 may reduce congestion at the well site. It should be appreciated that inclusion of a trailer is for illustrative purposes only and that the components may also be mounted on a skid, truck bed, flatbed trailer, or the like.

The illustrated embodiment further includes a multi-plunger pump 404, which may be an electric powered fracturing pump with up to 15 plungers. The pump is arranged at an end 406 of the trailer 402 opposite a gooseneck 408. As will be described below, the pump 404 includes inlet and outlet piping for receiving fluid at a low pressure and then directing high pressure fluid away from the pumping trailer 400. In various embodiments, the pump 404 is a multi-plunger type fracturing pump with up to 15 plungers with the following non-limiting features: stainless steel fluid end; main discharge connection; bleed connection; center gauge connection; and zoomie suction manifold. In embodiments, a 6" zoomie suction manifold (or appropriately designed custom suction manifold to feed all of the plungers within the pump) extends to the edge of the unit. The manifold terminates with two 6" winged union connections and includes two butterfly valves, or could have more unions and butterfly valves as appropriate to feed all of the plungers within the pump. A removable pulsation dampener is installed in the inlet side. The pump's rear discharge port is connected to the discharge manifold via 3" sub-connections. A 2" connection is installed on the pump center gauge opening and is utilized for the unit pressure transducer. The rear discharge manifold consists of a 3" lines and a 3" check valve. The rear discharge manifold extends to the back of the trailer. In the illustrated embodiment, an electronically powered grease pump system with pumping elements is installed to provide lubricant to the plungers. This system is equipped with a pump speed input to adjust lubrication timing based on speed. The power end of the pumps are lubricated by a hydraulic pump driven by an auxiliary electric motor. The power end lubrication system includes components such as relief valve, filters, instrumentation, plumbing, and lube oil reservoir.

The illustrated pump 404 is powered by an electric motor 412, in the embodiment shown in FIG. 4. The motor 412 is mounted proximate the pump 404 and coupled to the pump 404 via a coupling 414. In embodiments, the coupling utilized for connecting the electric motor 412 to the pump 404 does not exceed the manufacturer's recommended maximum angle under normal operation condition. The coupling 414 includes a guard with an access panel to enable the pump 404 to be turned without guard removal.

By way of example only, the motor 412 is a horizontal AC cage induction motor. The motor has the following example performance characteristics and features: 3000 HP, voltage 690V (but which may be rated for more), 3 Phase, insulation Class H, form wound, single shaft, new oilfield hub installed, anti-condensation strip heater installed, 100 ohm Platinum resistance temperature detectors (RTDs) installed on windings (2 per phase), and two cooling blower rated 15 hp, 3600 rpm, 460 V.

The illustrated trailer 402 further includes a slide out platform for servicing the pump 404 and motor 412, a human machine interface (HMI) 416, a variable frequency drive (VFD) 418, an HMI-VFD platform 420, a platform cover 422, a transformer 424, a transformer service platform, a motor control center (MCC) 426, a cooling system 428, and railings 430. Example configurations of various components are described below, however, are for illustrative purposes only and are not limiting.

The transformer 424 may include a 3,000 kVA step down transformer and associated electrical components mounted on the trailer 402. The 3,000 kVA step down transformer may include the following features: 3-phase 60 hertz, 80/80 degree C. rise, AA/FFA, 7.0 percent impedance with +/−ANSI Standard Tolerance, and phase relation Dyn1. The high voltage 13800 delta includes features such as 95 KV BIL, taps, and copper conductor. The low voltage 600Y/346 includes features such as 30 DV BIL, taps, and copper conduction. Other features include application, rectifier duty, 6 pulse, core/coil with HV to LV electrostatic shield and K-factor rating, monitoring with control power and temperature monitor, and interconnect cables from the switchgear to VFD with 545 DLO cables installed to connect the transformer system to the VFD.

In embodiments, the transformer 424 includes an enclosure structure constructed and braced for portable movement with features including heavy-duty construction, copper ground bus, NEMA 3R (outdoor Ventilated), and primed with ANSI 61 paint finish.

The VFD system 418 is designed to meet the electrical AC drive requirements for electric frac trailers that utilize 3 phase, 60 hertz, 690 volt electrical power source. The system is built in accordance with NEMA, ANSI, and NFPA regulations. The system meets the harsh environmental conditions typically found in oilfields. The VFD 418 may include the following example settings: 650 V motor, drive current of 2429 A, overload rating of 110% for 60 sec, supply voltage of 690 V, 6 pulse, supply frequency of 60 HZ, inverter modules, and cooling system with water/glycol. It should be appreciated that a 6 pulse VFD is an example, and other configurations would be 12 or 24 pulse. Moreover, as noted herein, the example settings provided are not intended to limit the scope of the disclosure, as design configurations may lead to modifications. Moreover, in various embodiments, example drives include the following: 2500 A circuit breaker with UVR trip coil, input line reactors, semiconductor fuses with blown-fuse switches, control components, liquid cooled rectifiers, 3 inverter IGBT modules, 3 SMPS modules, shielded ribbon cables, digital controller with parameter based operations and I/O board, door mounted HMI for setup, monitoring, and diagnostics, MV 3000 I/O panel, control power transformer, 24 V power supply, relays, indicating lights, and emergency stop push button. In various embodiments, the VFD 418 also includes welded stainless steel piping coolant headers with hose connections to the modules. However, it should be appreciated that other piping may be used, such as carbon steel or the like. Each module is connected to the supply and return headers with a ¾" hose and isolation valve. The VFD enclosure is an IP66 enclosure that may include two internal heat exchangers are supplied for removing heat from the air inside of the drive enclosure and four frames are suppled in the enclosure for power cabling, control cables, and piping. Moreover, the VFD enclosure is covered by a rain shield, which extends out over the service platform to protect the components from rain while being serviced. In embodiments, the unit has a dry type 3 phase, 60 HZ, power distribution transformer with 690 V primary, and 240/120 V secondary with taps.

In embodiments, the MCC control enclosure is an outdoor weather-proof enclosure. The structure is constructed and braced for portable movement and has features such as access panels, all external off unit connections wired to plug-in connectors accessible from outside, primed and finished painted inside and out, LED external lighting, cooling provided via liquid cooled radiator, and frac pump motor is hard wired on the unit.

By way of example, the MCC 426 is fed by a circuit breaker independent from the VFD circuits. The MCC 426 may include features such as one MCC, Seismic Zone 4, 400 A Main bus, Rating: 42,000 AIC, 600 V, 60 HZ, 3 phase, and 3 wire. Furthermore, there may be four size 1 full voltage non-reversing starters of 10 HP with hands off auto switch. Additionally, there may be 2 full voltage non-reversing starters of 25 HP with hands off auto switch. The MCC may also include one lighting panel, 150 A, with circuit breakers as required.

Supplied and installed on each of the pump discharge units is a 0-15,000 PSI pressure transducer with hammer union connections. The transducers are installed with a protective guard in various embodiments. Also, in embodiments, there is a single touchscreen display for local pump control. However, other pump control may also be included. In various embodiments, the unit comes installed with either Ethernet communications or RS-485 serial. It may also be equipped with wireless communications to sensors in lieu of cabled communication and sensor connections.

In various embodiments, the trailer 400 may also include an access hatch on the coupling guard, cable gland protection, check valve bracket support, spools for the frac cables, step grip tape on the handrails and ladder, grounding for the trailer, ladder/stair access with handrails, land gear crank, oil radiator bracket, power end tank temp sensor, fire extinguisher, slide out work platform to work on the pump, motor, and motor cooling blowers, slide out work platform has a safety hinged door to prevent falls, the VFD has over pressure trip wiring and wireless capabilities, Vic Clamps, transformer louver design large metal mesh filter to prevent dust/dirt intrusion, and load shedding (via intelligent pump control throttle control and other load responses).

Alternate embodiments provide a for installation on other oilfield and non-oil field equipment such as, but not limited to: a cementing unit; a nitrogen unit; a hydration unit; a blender; an intensifier or long stroke pump; an acid pump; a pump down unit; a wire-line; a data van; a twin pumper; a turbine mobile power unit; a switchgear; a substation; a transformer; a dry gel unit; a boost pump, or the like.

It should be appreciated that the pump trailer 400 is for illustrative purposes only and that other configurations may also be utilized. For example, alternate configurations may include pumps that can be powered by, for example: one or more turbine generators; one or more diesel generators; one or more natural gas generators; grid power; any other electrical source; or a combination of the above. In addition, alternate embodiments can provide pump units: mounted on a trailer, skid, bodyload, or any other platform; having multiple frac pump units; having diesel pumps as well as electric pumps (hybrid fleet); having an intensifier pump connected hydraulically to the pumps; wherein the pump can be used to pump down a tool into the well instead of doing pressure pumping; and having different voltages. Moreover, the components described herein can be separated and put on separate platforms that may themselves be on a trailer, skid, body load, or other platform.

Figure 5:
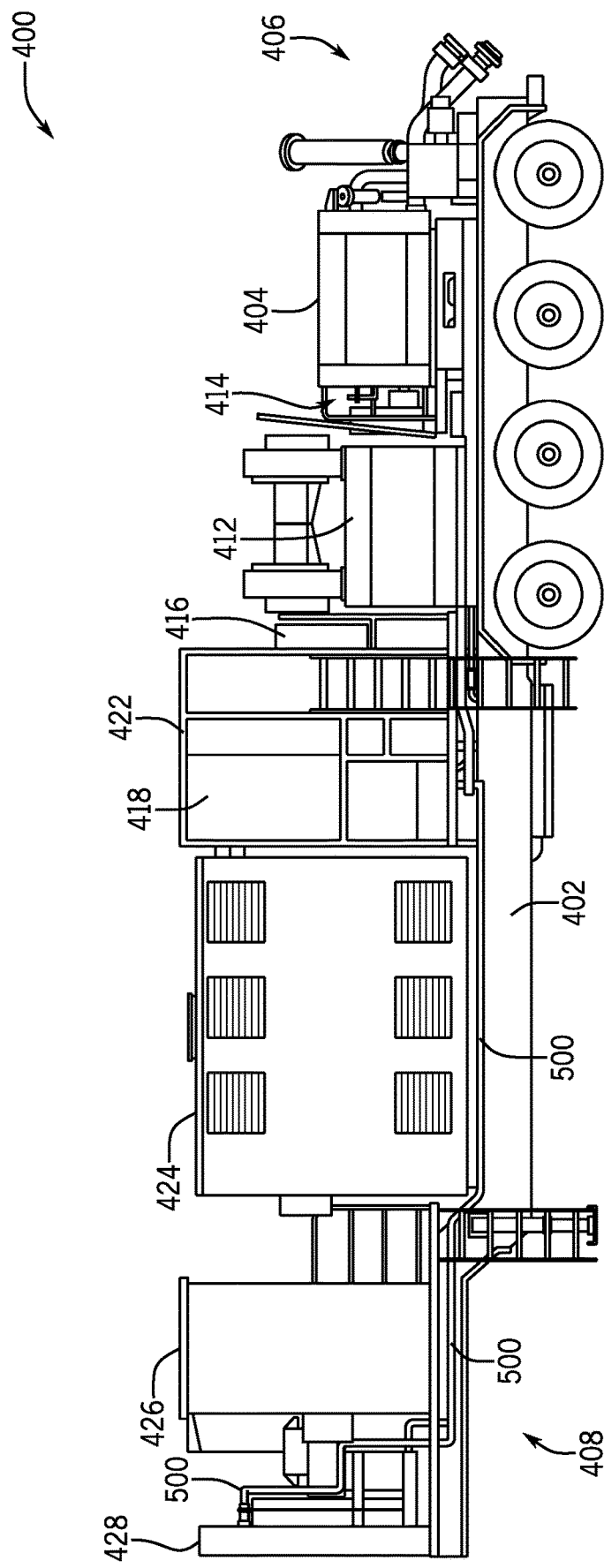
FIG. 5 is a side elevational view of an embodiment of a pumping trailer, in accordance with embodiments of the present disclosure.

FIG. 5 is a side view of an embodiment of the pump trailer 400. As illustrated, the pump 404 is arranged proximate the motor 412, which facilitates operation of the pump. The HMI 416 is arranged below the cover 422 and proximate the VFD 418 on the VFD platform 420. In the illustrated embodiment, the transformer 424 is arranged on the trailer 402, however it should be appreciated that in other embodiments the transformer 424 may be separately mounted, for example on a different trailer, skid, truck, or the like. The gooseneck 408 includes the cooling system 428 and MCC 426, in the illustrated embodiment. As described above, in various embodiments the VFD 418 is liquid cooled, for example via the headers 500 extending from the cooling system 428 to the VFD housing. The cooling system 428 may also be used to cool various other components.

Figure 6:
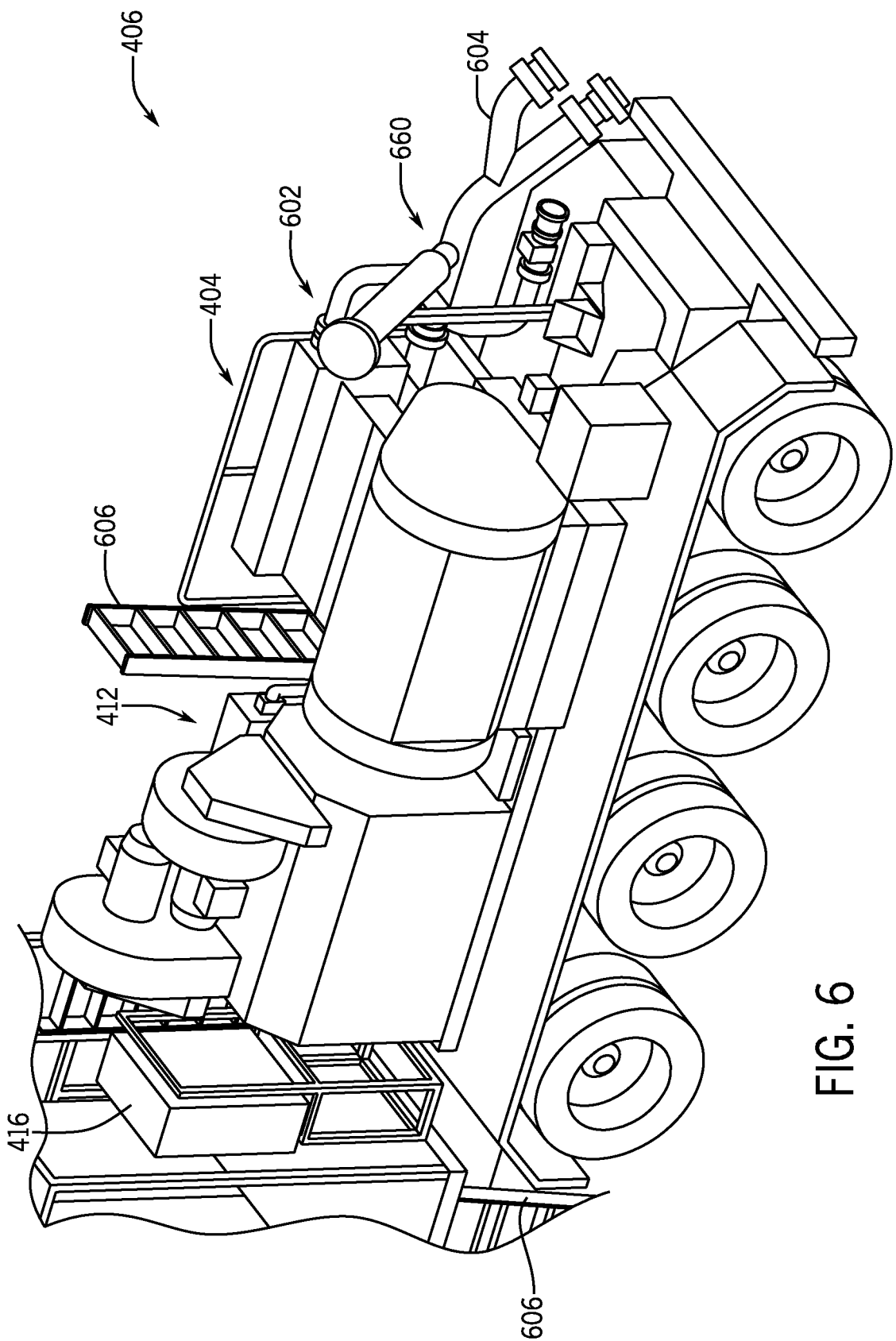
FIG. 6 is a perspective view of an embodiment of an end of a pumping trailer, in accordance with embodiments of the present disclosure.

FIG. 6 is a perspective view of an embodiment of the end 406 of the trailer 402 including the pump 404, motor 412, and partially including the VFD platform 420. Furthermore, illustrated in FIG. 6 is the service platform including a ladder for access to the platform including the HMI and VFD, the motor, motor blowers with auxiliary motors, the pump with power end and fluid end, slide out platform handrail, suction iron, discharge iron, suction dampener, and a greasing unit. In the illustrated embodiment, auxiliary systems described above are also illustrated. The pump 404 includes a suction end 600 and a discharge end 602. As shown in FIG. 6, piping 604 extends from the suction end 600 and the discharge end 602 to receive and direct fluid to and from the pumping trailer 400. It should be appreciated that various components, such as valves, couplings, sensors, and the like may be incorporated into the piping 604 and the end 406 of the trailer 402. In the illustrated embodiment, ladders 606 (shown in their stowed position) enable ingress and egress to various locations where maintenance operations may occur. Accordingly, operations utilizing the pumping trailer 400 may be easier for operators.

Figure 7:
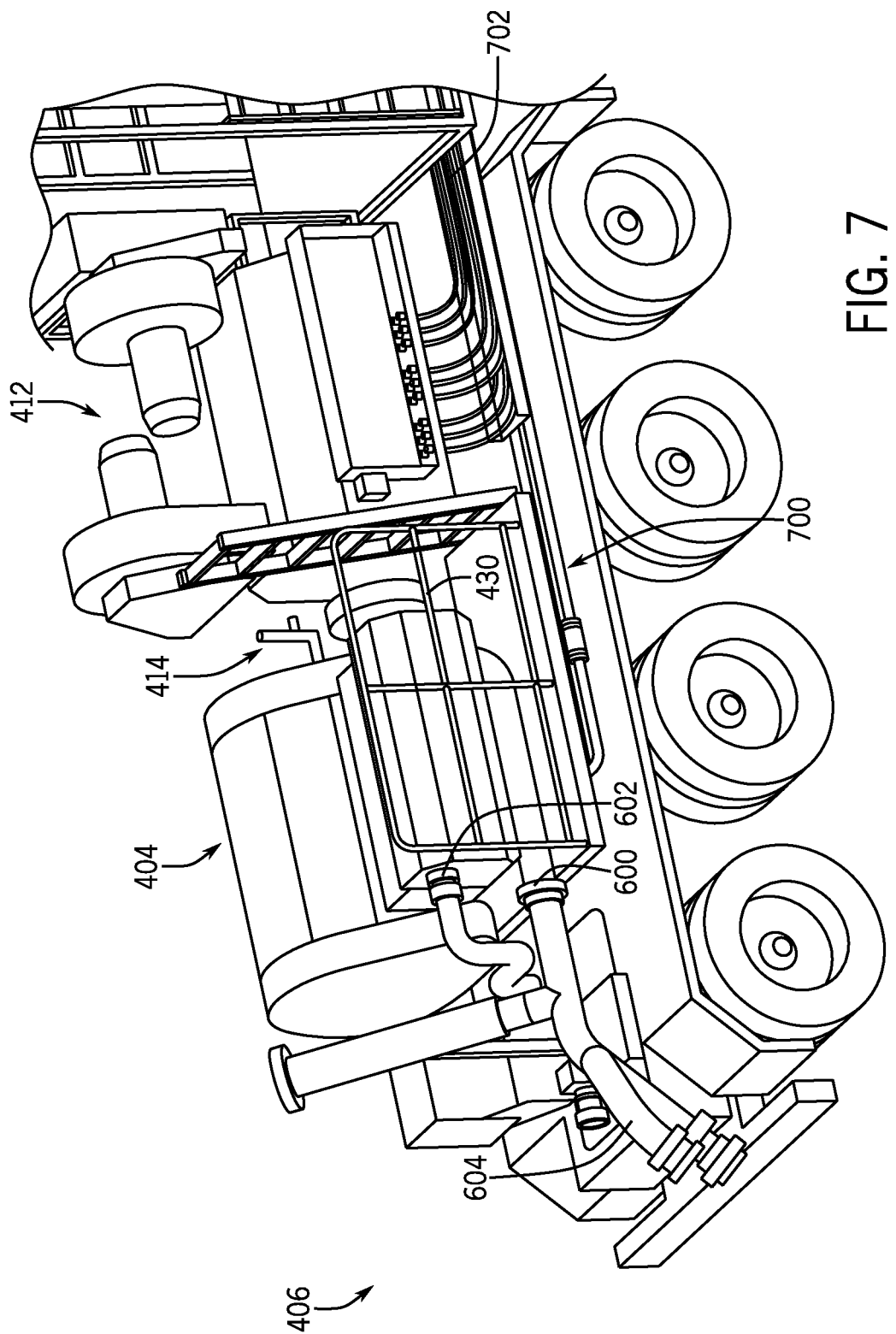
FIG. 7 is a perspective view of an embodiment of an end of a pumping trailer, in accordance with embodiments of the present disclosure.

FIG. 7 is a perspective view of an embodiment of the end 406 of the trailer 402. The illustrated embodiment includes the slide out platform 700, which is illustrated in a stored configuration. The illustrated handrail 430 may be used to side the platform 700 in and out, thereby facilitating maintenance operations on the pump 404. Sliding and storing the platform 700 enables a width of the trailer 402 to be reduced, which may reduce wide load permitting to transport the trailers between different locations. As illustrated, cabling 702 extending from the motor 412 is routed below the VFD platform 420, thereby reducing the likelihood the cabling 702 is disturbed. As will be appreciated, in various embodiments, because the components on the trailer 402 are substantially fixed relative to one another, the cabling and other connections may be made prior to arriving at the well site, thereby reducing time spent preparing for fracturing operations. Moreover, portions of the cabling and/or connections may be formed from stronger or more rigid materials because they will not be removed or may be moved less often than other cabling, which may be routed in different configurations at each well site.

Figure 8:
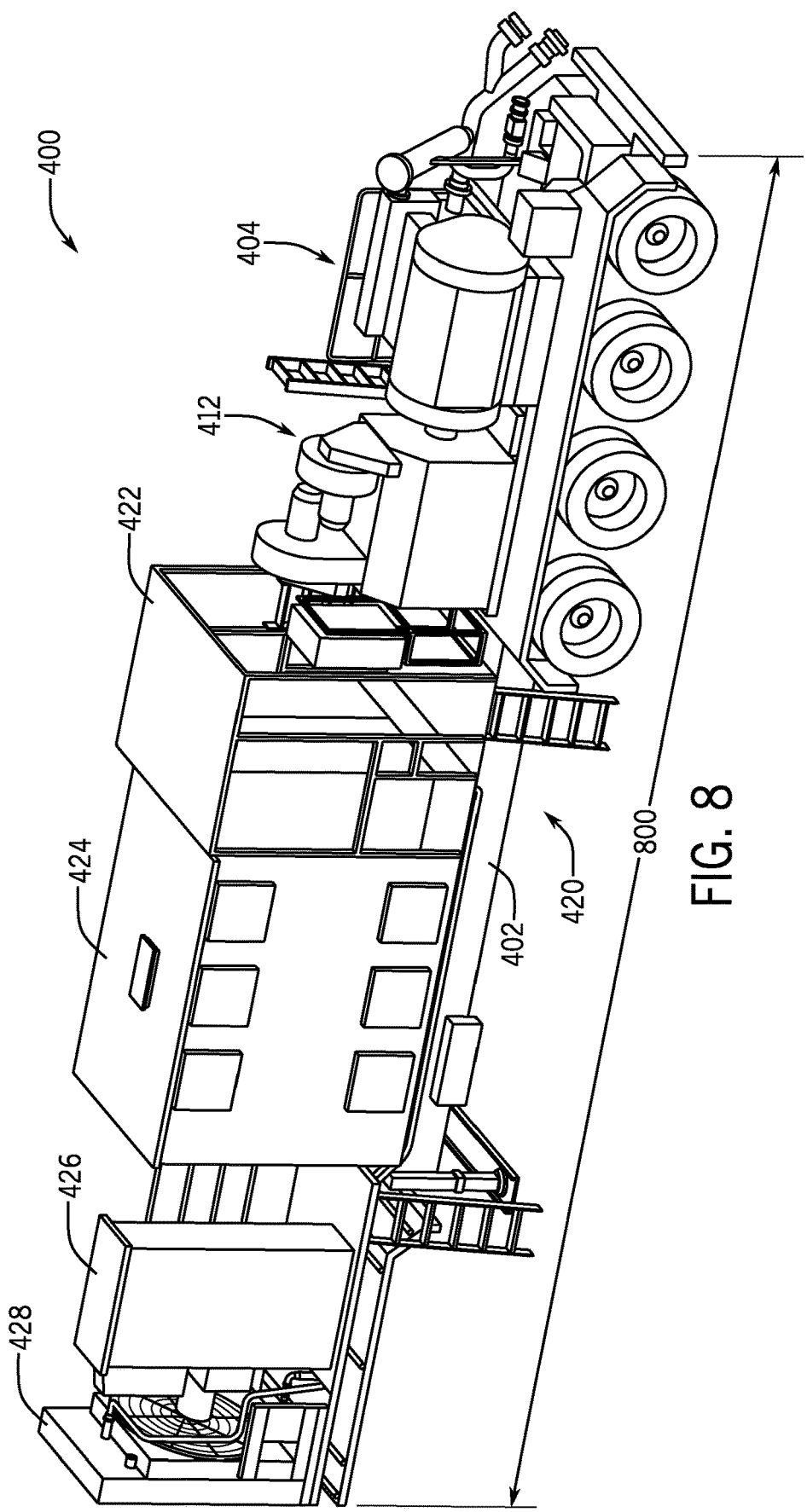
FIG. 8 is a perspective view of an embodiment of a pumping trailer, in accordance with embodiments of the present disclosure.

FIG. 8 is a perspective view of an embodiment of the pumping trailer 400. As previously noted, various components are illustrated in FIG. 8, such as the cooling system for the VFD on the gooseneck, the MCC, ladder handrails and platform for service on the gooseneck, transformer, VFD, VFD-HMI service platform with rain cover, electric motor, blowers, frac pump, suction iron, and discharger iron, among other components. As described above, various components are arranged along a length 800 of the trailer 402. It should be appreciated that the illustrated ordering or relative positions of the components is for illustrative purposes only, and in other embodiments, components may be in different locations, as may be suitable for operating conditions. However, it may be advantageous to position components proximate to associated or operationally linked components. Moreover, arrangement configurations may be made with respect to expected maintenance operations.

Figure 9:
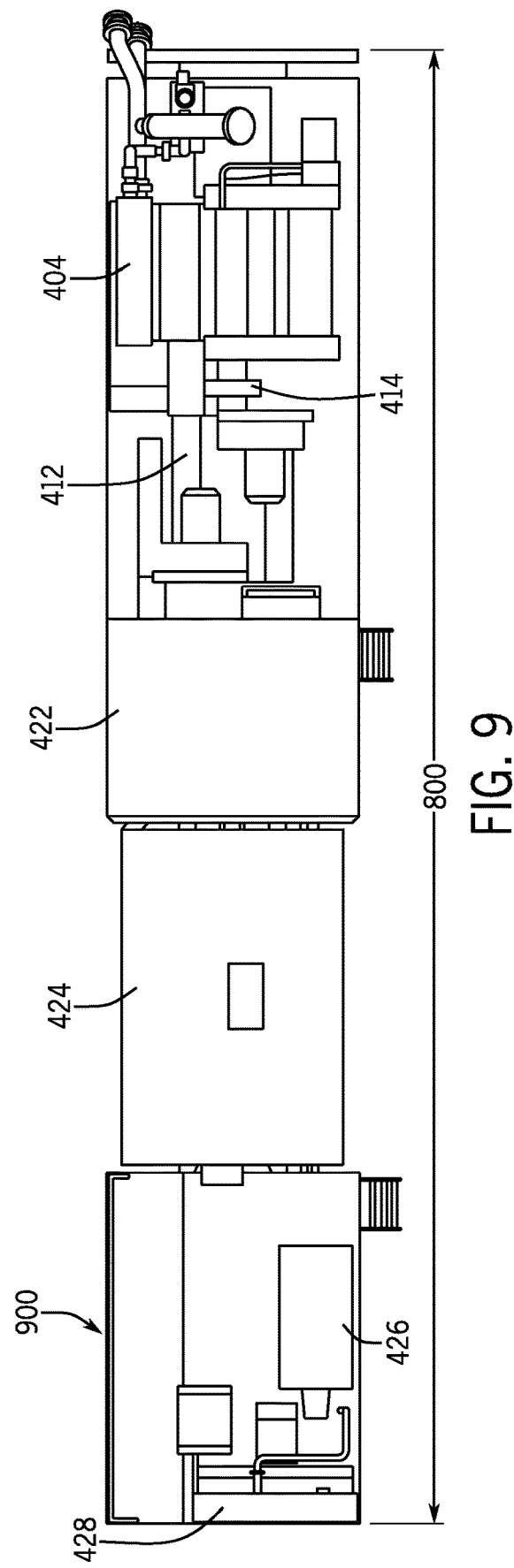
FIG. 9 is a top plan view of an embodiment of a pumping trailer, in accordance with embodiments of the present disclosure.

FIG. 9 is a top plan view of an embodiment of the trailer 402 further illustrating the configuration of the components along the length 800. The illustrated top plan view includes the cooling system, MCC, gooseneck platform, rollers for cables on the platform with a hinged cable try to closer over so that the cables are covered, transformer, roof for VFD and rain protection, electric motor, and pump, among other components. As illustrated, a transformer service platform 900 provides space for operations to connect to the transformer 424, adjust operations using the MCC 426, and/or perform maintenance on the cooling system 428. The illustrated transformer service platform 900 is arranged on the gooseneck 408 and has a higher elevation, relative to the ground plane, than the VFD platform 420. As noted above, a relative width of the trailer 402 is substantially constant along the length 800, which may reduce requirements to get wide load permits for transportation along roadways. In various embodiments, similar slide or platforms, such as those described with respect to the platform 700, may further be integrated into other locations of the trailer 402 to facilitate pumping and/or maintenance operations.

In various embodiments, the trailer 402 may be referred to as having different areas or regions. However, such description is for illustrative purposes only and is not intended to limit the scope of the present disclosure. For example, a first area may be the region having the pump 404 and the motor 412. More, a second area may be the region having the VFD 418, which may be covered by the platform cover 422. Additionally, a third area may be region having the transformer 424 while the fourth area may be the region having the cooling system 428. It should be appreciated that, in various embodiments, these areas may partially or completely overlap. For example, the first area may also include the platform, the fourth area may also include the transformer 424, and the like.

Figure 10:
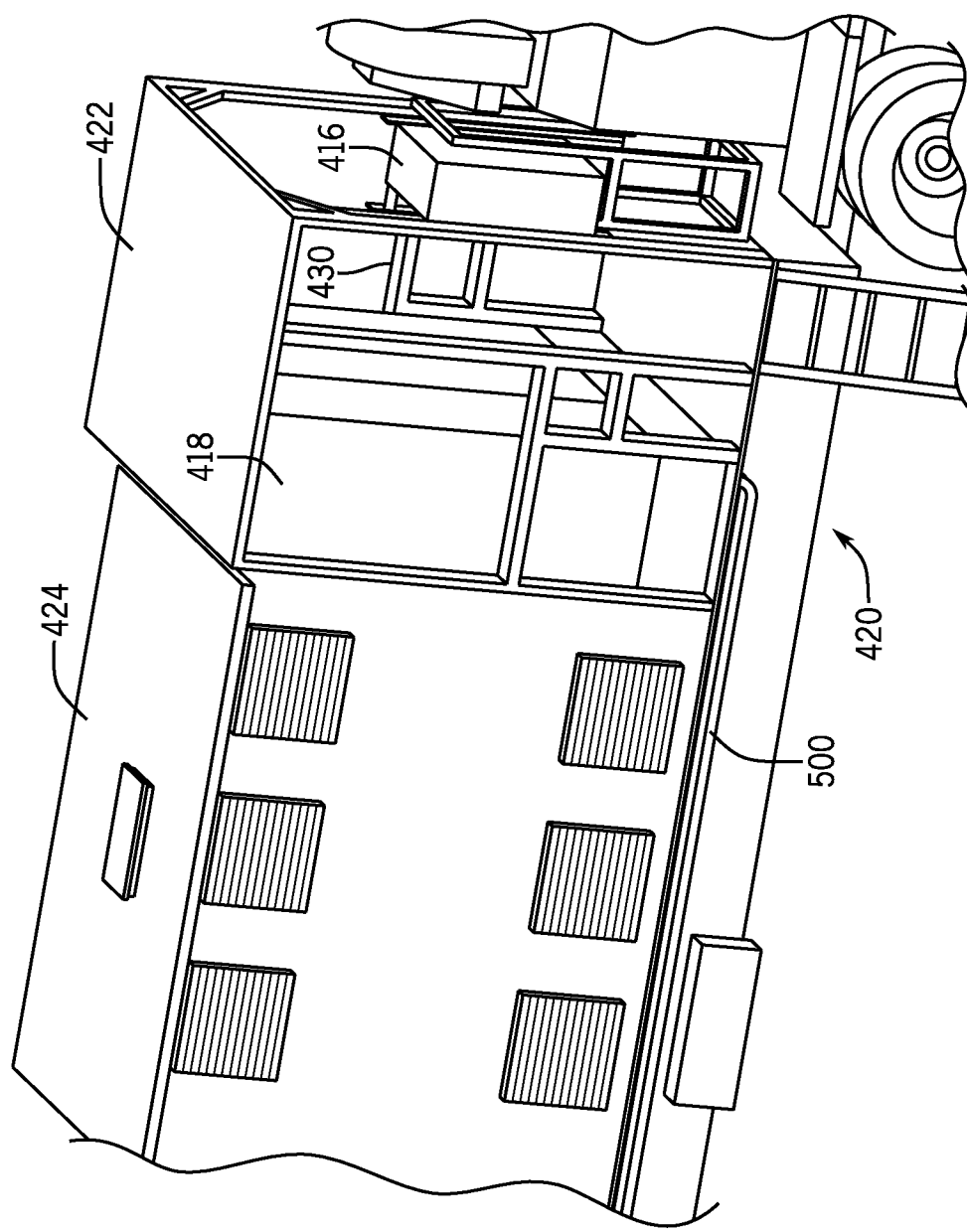
FIG. 10 is a perspective view of an embodiment a platform of a pumping trailer, in accordance with embodiments of the present disclosure.

FIG. 10 is a perspective view of an embodiment of the pump trailer 400 illustrating the transformer 424 arranged proximate the VFD platform 420. In the illustrated embodiment, the transformer, VFD, HMI, and platform with a ladder are illustrated. As shown, the VFD platform 420 includes the platform cover 422, thereby enabling operators to perform maintenance or control operations in inclement weather. Furthermore, as described above, the cooling headers 500 are illustrated coupled to the VFD housing.

Figure 11:
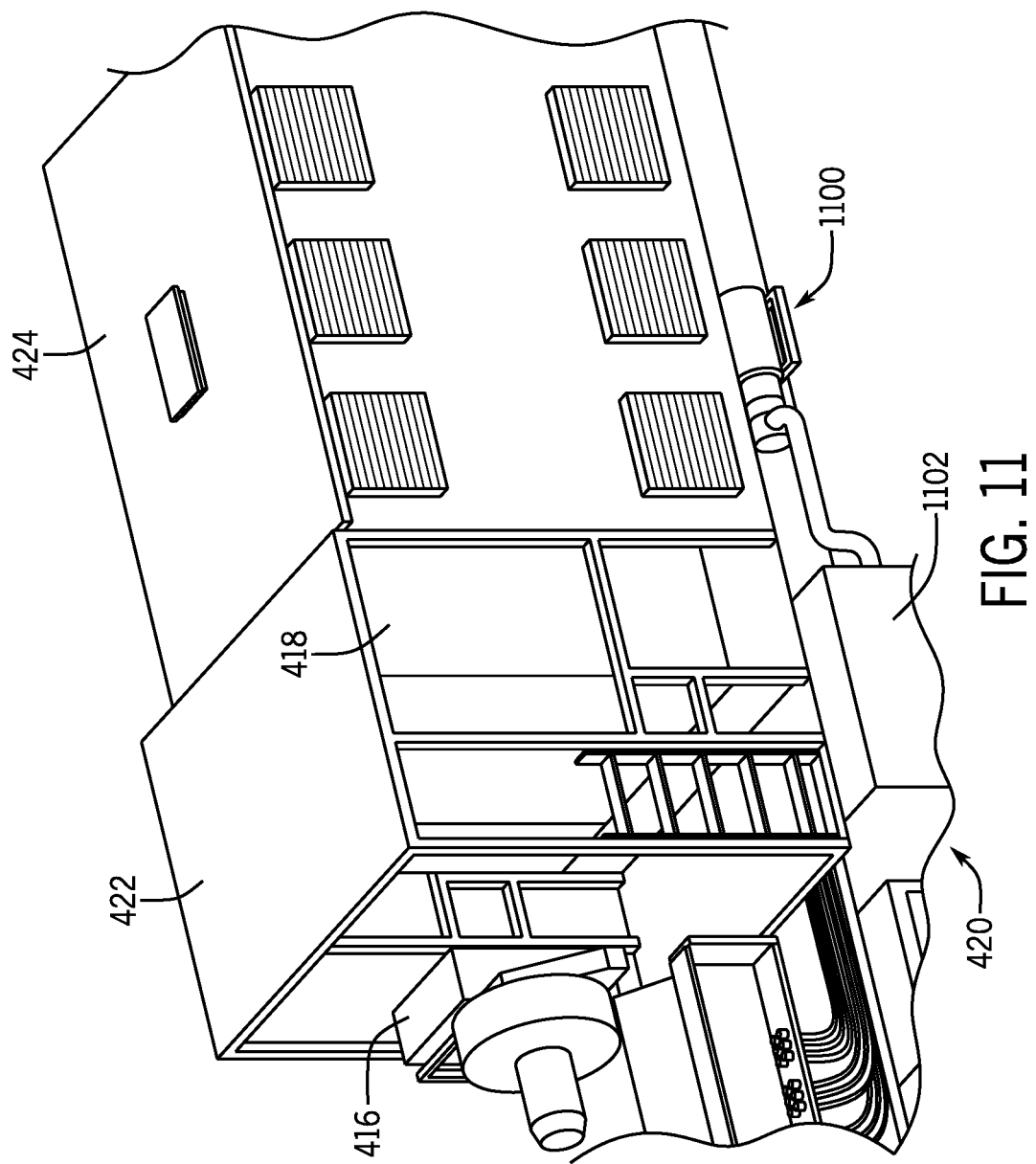
FIG. 11 is a perspective view of an embodiment a platform of a pumping trailer, in accordance with embodiments of the present disclosure.

FIG. 11 is a perspective view of an embodiment the pump trailer 400 illustrating the transformer 424 arranged proximate the VFD platform 420. Further illustrated are the transformer, VFD, platform, HMI, electric motor, and auxiliary motor/pump and tank. For example, an auxiliary pump 1100 coupled to a tank 1102 is illustrated below the transformer 424 and the VFD platform 420.

Figure 12:
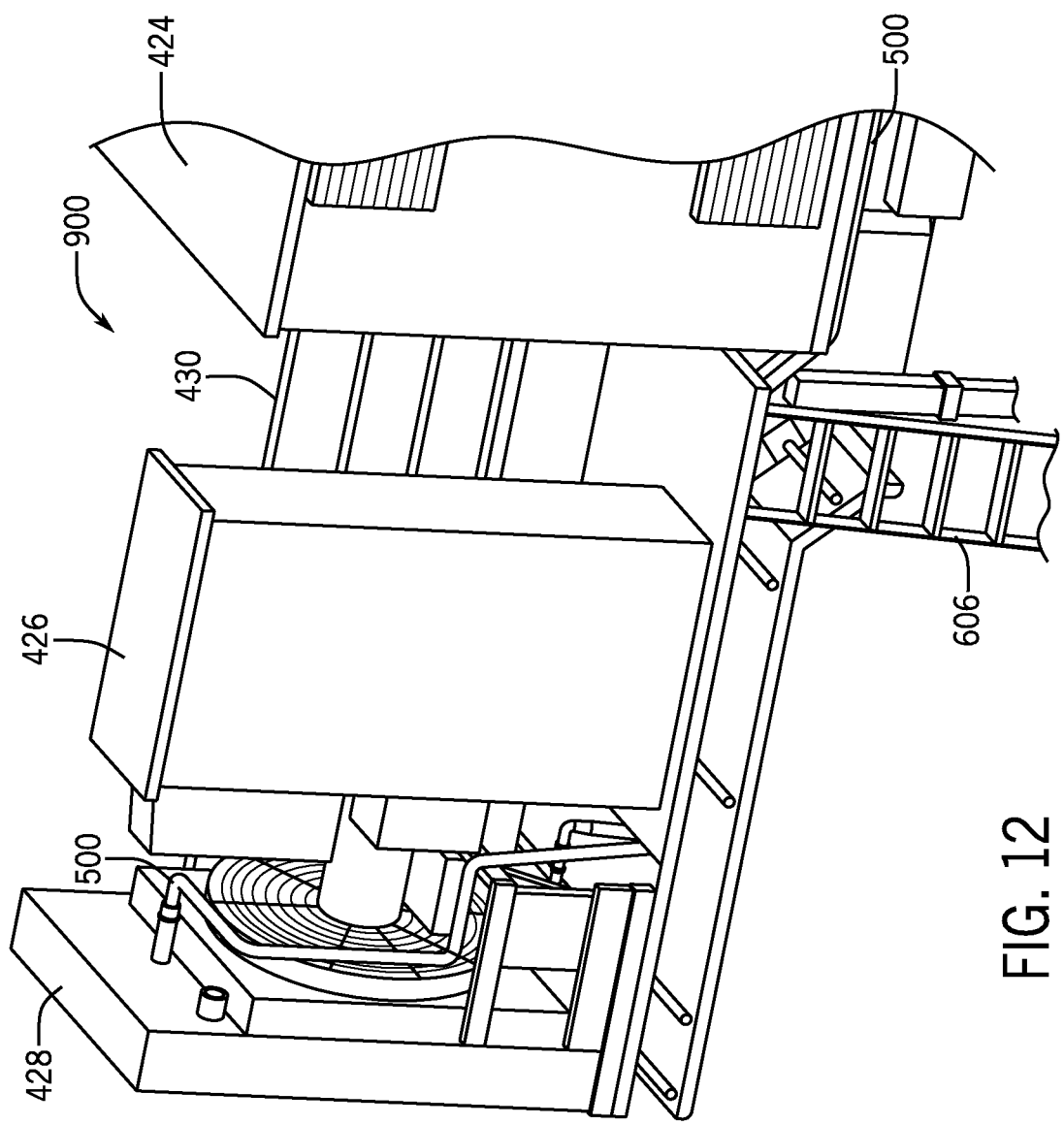
FIG. 12 is a perspective view of an embodiment a platform of a pumping trailer, in accordance with embodiments of the present disclosure.

FIG. 12 is a perspective view of an embodiment of the transformer service platform 900 arranged at the gooseneck 408. In the illustrated embodiment, the cooling system 428 includes a radiator that distributes cooling liquid (e.g., water/glycol) via the headers 500. The MCC 426 is arranged proximate the cooling system 428. Also illustrated in the ladder 606, described above.

Figure 13:
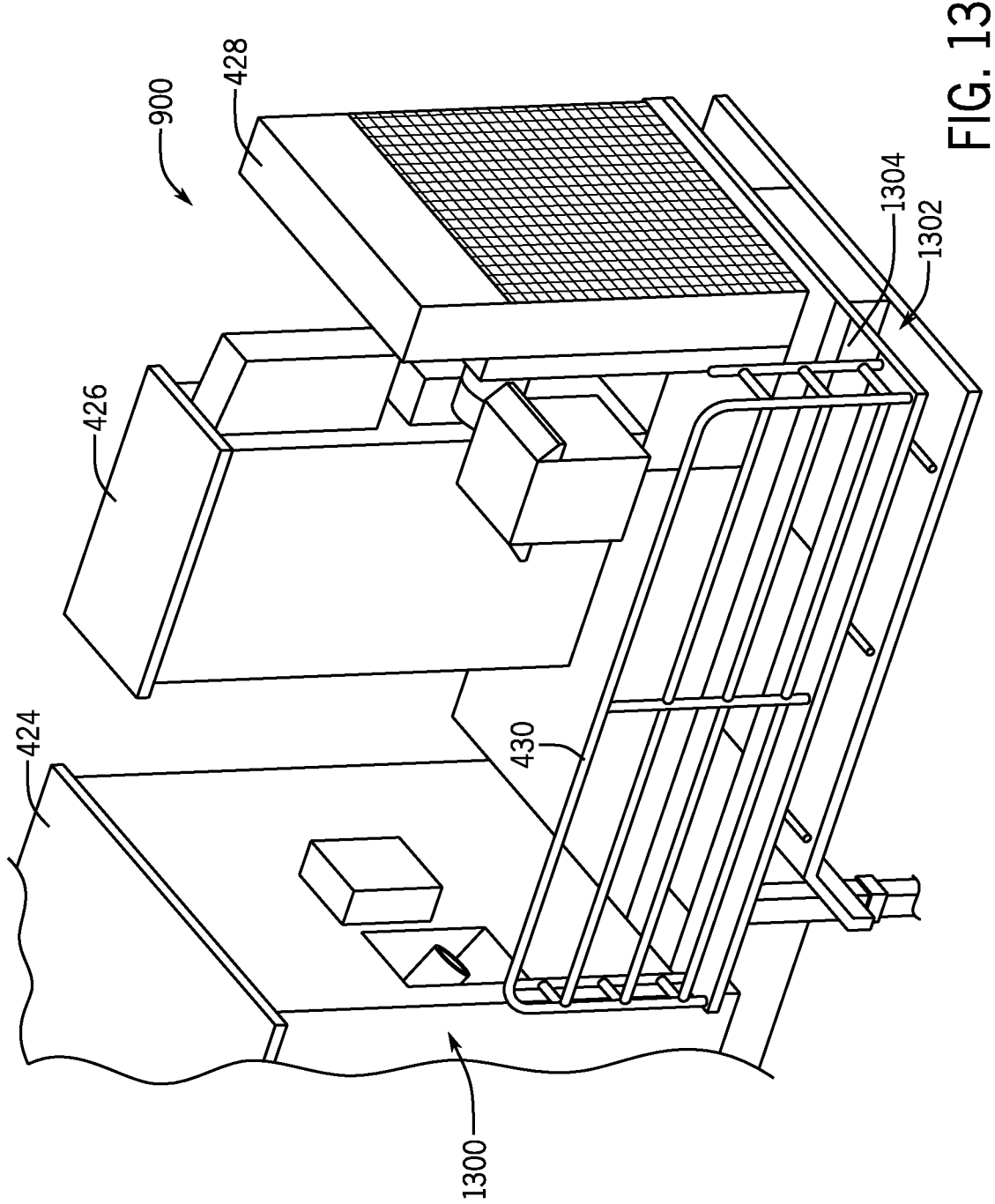
FIG. 13 is a perspective view an embodiment of a platform of a pumping trailer, in accordance with embodiments of the present disclosure.

FIG. 13 is a perspective view of an embodiment of the transformer service platform 900 including the cooling system 428 and the MCC 426. The present embodiment includes the gooseneck platform, 13.8 kV cable receptacle on the transformer, MCC, cooling system, and cable trays with hinges closed, blocking a view of the rollers. In the illustrated embodiment, the transformer 424 is accessible via the platform 900 and includes a connection 1300 for receiving a single 13.8 kV cable. The illustrated embodiment further includes cable trays 1302 arranged below hinged covers 1304 within the floor of the platform 900. As a result, cables may be arranged along the platform 900 within the trays to reduce the likelihood of damage.

Embodiments of the present disclosure further include a platform that allows for a technician to work on a pump more easily and safely. According to some embodiments, the platform can be electric to allow for ease of deployment. While shown installed on an electric unit in the drawings, the platform can also be installed on a diesel-powered pump trailer. The present technology provides numerous advantages over known, and in particular non-electric, hydraulic fracturing systems. For example, the technology provides the following features, among others: an electric slide out platform; a folding non-vertical ladder incorporated into the slide out platform; a safety hinged door rail on one or both sides to prevent falls; a remote switch a retract, off, and extend three-position switch; a battery to supply power for one or more linear actuators and one or more control switches; a linear actuator with a brushed DC motor and cylinder to move the platform in and out. The linear actuator may have one or more of the following attributes: a voltage of about 24 VDC; a force of about 850 lbs (dynamic load); a static load of about 1700 lbs; a no load current of about 1.8 A; a full load current of about 10.0 A; a speed at no load of about 0.66 in/sec; a speed at full load of about 0.55 in/sec; a stroke of up to about 40 inches; an internal adjustable limit switch; a customizable limit switch feedback; an ACME screw type driver; a brushed DC motor; a housing made of steel no 45; a rod made of stainless steel 305; a noise of less than about 45 dB; a duty cycle of up to about 25% (5 min on, 15 min off); the ability to operate in temperatures of −25° C. to 65° C.; and protection class of IP65.

In some embodiments, the DC battery can be recharged by: one or more turbine generators; one or more diesel generators; one or more natural gas generators; grid power; diesel engines; natural gas engines; any other electrical source; or any combination of the above.

In various embodiments, Internal components of the linear actuator may include some or all of the following components: an actuator case; a case top cap; a case base support; a case base gasket; a case base screw; a shaft with mounting hold; a shaft guide; a treaded shaft drive; a shaft gear lock; a limit switch gear; a shaft bearing enclosure; a shaft top bearing holder; a washer; a shaft ball bearing; a shaft holder; a shaft holder lock; a shaft bearing bottom support; an actuator base; an actuator base gasket; a shaft gear wheel; an intermediate gear; a limit switch base; a limit switch gear 1; a limit switch gear 2; a limit switch gear 3; a limit switch gear support; a limit switch gear support screw; an actuator bottom mount; an actuator bottom case; an actuator base screw gasket; an actuator base screw O-ring; an actuator base screw; an actuator bottom mount nut; a power cable; a power cable lock screw; a power cable lock; a power cable sleeve; a power cable nut; a base cable sleeve; a limit switch trigger screw; a limit switch trigger washer limit switch trigger spring; a limit switch trigger spring; a limit switch trigger support; a limit switch trigger; a limit switch screw; a limit switch gear 4; a limit switch gear 5; a motor washer; a motor locking washer; a limit switch; a base holding screw; a motor gear; a motor intermediate gear; a motor base screw; a motor base screw washer; a motor bottom cap; a motor bottom bearing; a brush holder PCB; a brush holder PCB screw; a motor brush spring; a motor brush; an electric motor rotor; a motor case o-ring; a motor case and stator; a motor o-ring; a motor top spring washer;

a motor top cap; a motor top bearing; a motor case screw; and a motor case screw washer.

Figure 14:
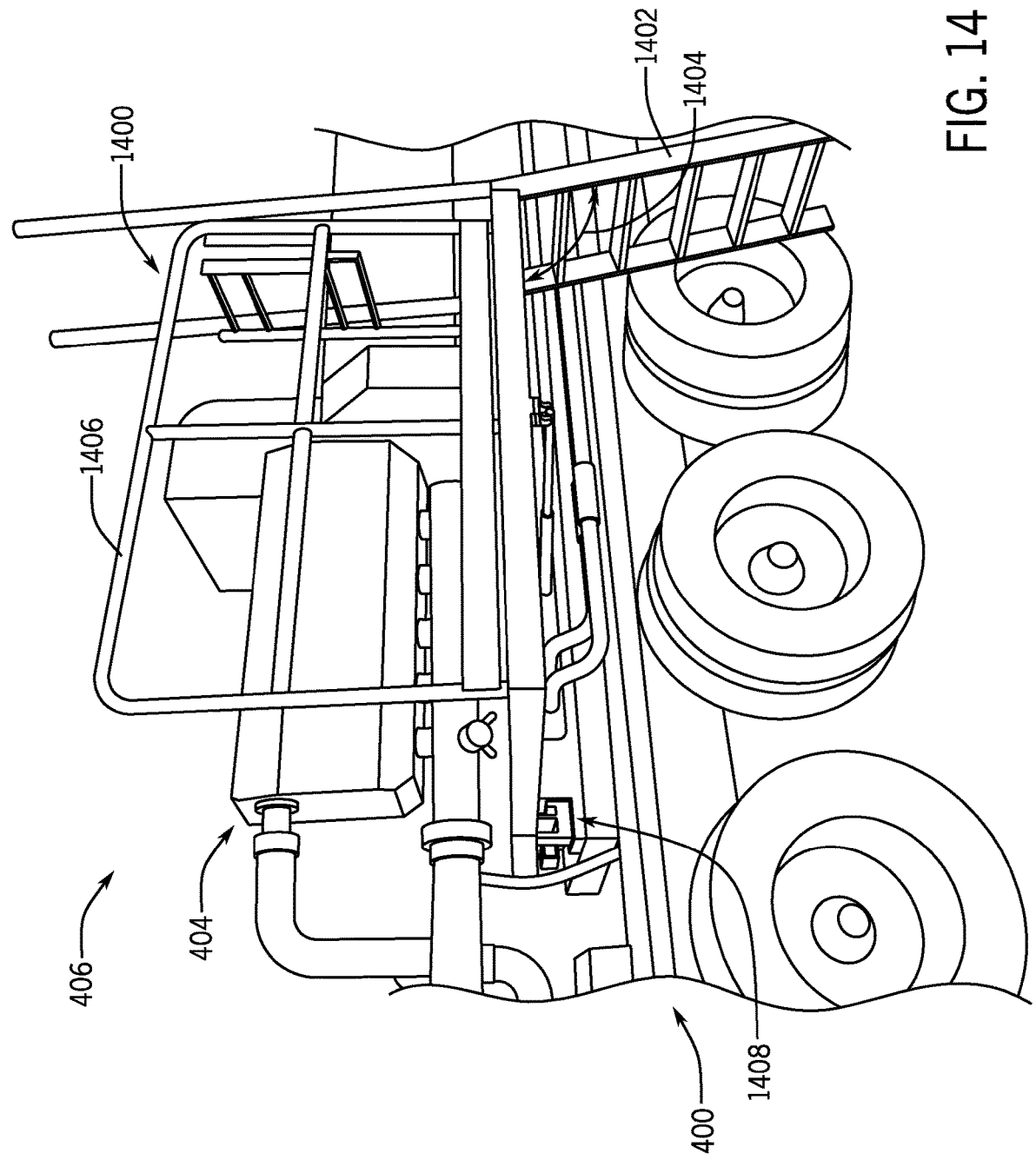
FIG. 14 is a perspective view of an embodiment of a platform of a pumping trailer, in accordance with embodiments of the present disclosure.

FIG. 14 is a perspective view of an embodiment of a slide out platform 1400 arranged along the trailer 400. The illustrated slide out platform 1400 is positioned at the end 406, opposite the gooseneck 408, but it should be appreciated that the slide out platform 1400 may be arranged at a variety of different locations and, moreover, there may be multiple slide out platforms 1400 incorporated into the trailer 400. The slide out platform 1400 includes a non-vertical ladder 1402 in a down or deployed position. It should be appreciated that the ladder 1402 may be stowed in an up or locked position during transport or the like. While a non-vertical ladder 1402 is illustrated (e.g., arranged at an angle 1404 with respect to the platform 1400, in other embodiments the ladder 1402 may be vertical (e.g., the angle 1404 is approximately equal to 90 degrees). Furthermore, the ladder 1402 is illustrated at an end of the platform 1400 that is closer to the gooseneck 408 than a second end, however, it should be appreciated that the ladder 1402 may be arranged at the opposite end, or the platform 1400 may include two ladders, one at each end.

Further illustrated is a handrail 1406 extending along a length of the platform 1400. The handrail 1406 may be used as fall protection. For example, a technician may tie off on the handrail 1406 while performing maintenance operations on the pump 404. It should be appreciated that the illustrated handrail 1406 is not intended to be limited to a handrail with three vertical posts and three horizontal posts, and other configurations may fall within the scope of the present disclosure.

FIG. 14 also illustrates an actuator bracket 1408 arranged below the platform 1400. The actuator bracket 1408 may support an actuator utilized to drive movement of the platform 1400 axially outward from the pump 404. That is, the platform 1400 may be driven from a position where the platform 1400 is closer to the pump than the position illustrated in FIG. 14.

Figure 15:
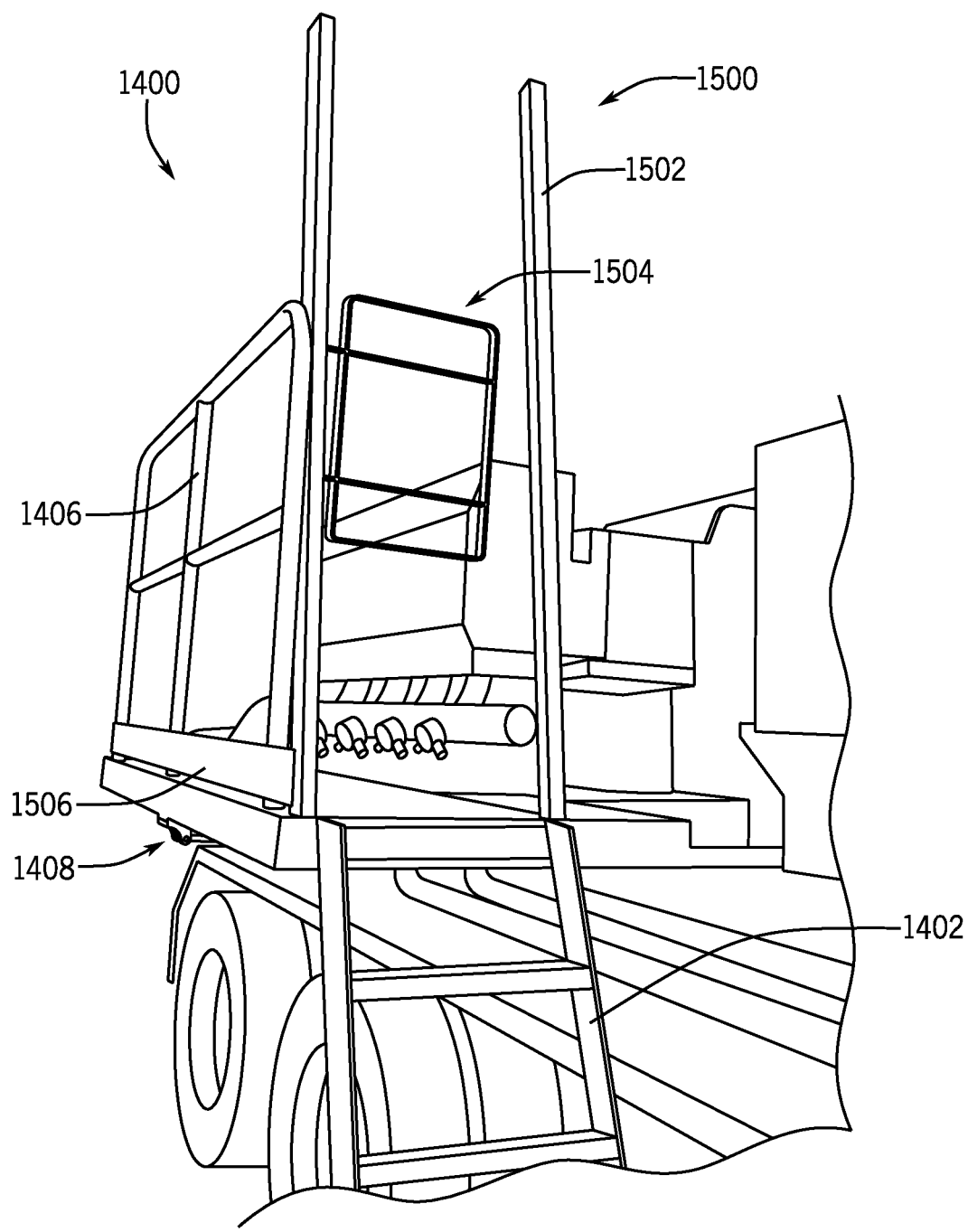
FIG. 15 is a perspective view of an embodiment of a platform of a pumping trailer, in accordance with embodiments of the present disclosure.

FIG. 15 is a perspective view of an embodiment of the platform 1400 including various features that may further provide fall protection or safety enhancements, among other benefits. For example, the illustrated embodiment includes a support bracket 1500 for stowing the ladder 1402 when not in use. As illustrated, the bracket 1500 includes a channel 1502 that may receive at least a portion of the ladder 1402. Additionally, a spring-loaded retention rail 1504 is positioned on the platform 1400. The retention rail 1504 may be configured to rotate about an axis in response to contact from a user. In various embodiments, the retention rail 1504 may be biased in one direction, however, in other embodiments, the retention rail 1504 may rotate in multiple directions (e.g., both clockwise and counter-clockwise). The retention rail 1504 may deploy automatically in response to deployment of the platform 1400. It should be appreciated that while a single retention rail 1504 is illustrated in FIG. 15, there may be multiple retention rails. For example, a second retention rail may be positioned at the opposite end of the platform 1400.

As described above, the handrail 1406 extends along a length of the platform 1400. The handrail 1406 includes a toe kick plate 1506, which may prevent or reduce the likelihood of tools falling off the rear of the platform. As noted above, various different configurations may be utilized for the handrail 1406.

In various embodiments, the platform 1400 is actuator driven to enable movement between a stored position (not shown) and a deployed positon (shown). The deployed position drives the platform 1400 outward and away from the pump 404, for example, in a direction substantially perpendicular to a longitudinal axis of the trailer 400. The actuator may be powered by a DC motor, which as noted above, may be recharged by a variety of different methods and equipment. The actuator drive the platform 1400 along sliding wheel bearings and a platform bracket that supports movement of the platform 1400, while also providing structural support when the platform 1400 is in the deployed position. For example, each side of the platform 1400 may include 2 vertical and 1 horizontal oriented wheel to facilitate movement of the platform 1400.

Figure 16:
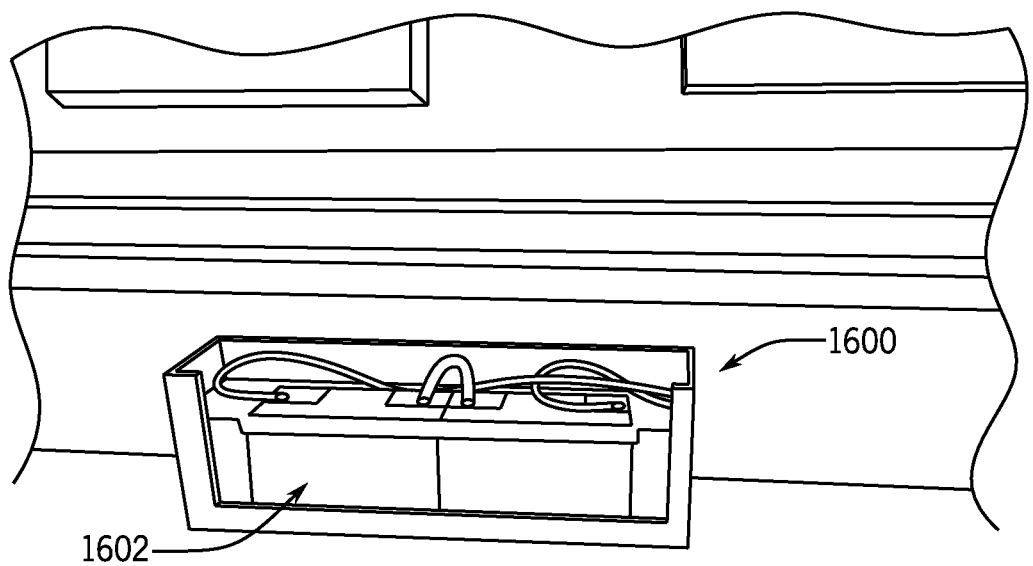
FIG. 16 is a perspective view of an embodiment of a battery bracket, in accordance with embodiments of the present disclosure.

FIG. 16 is a perspective view of an embodiment of a battery bracket 1600 that includes a battery 1602 for driven operation of the platform 1400. In various embodiments, the battery 1602 is a DC battery that provides power to a cylinder and control switch. The battery 1602, in various embodiments, can be recharged from a microgrid (e.g., a power source such as a turbine, diesel generator, utility, or other power source). The battery can also be multiple smaller batteries electrically connected in parallel to achieve higher amperage output or in series to achieve a higher voltage, a configuration of multiple batteries in parallel and in series can be used to a achieve a desired voltage and amperage output. In various embodiments, access to the battery 1602 may be limited in order to reduce the likelihood of disconnection. Furthermore, the battery bracket 1600 may be cushioned or otherwise supported to reduce impacts on the battery 1602, for example, during transportation.

Figure 17:
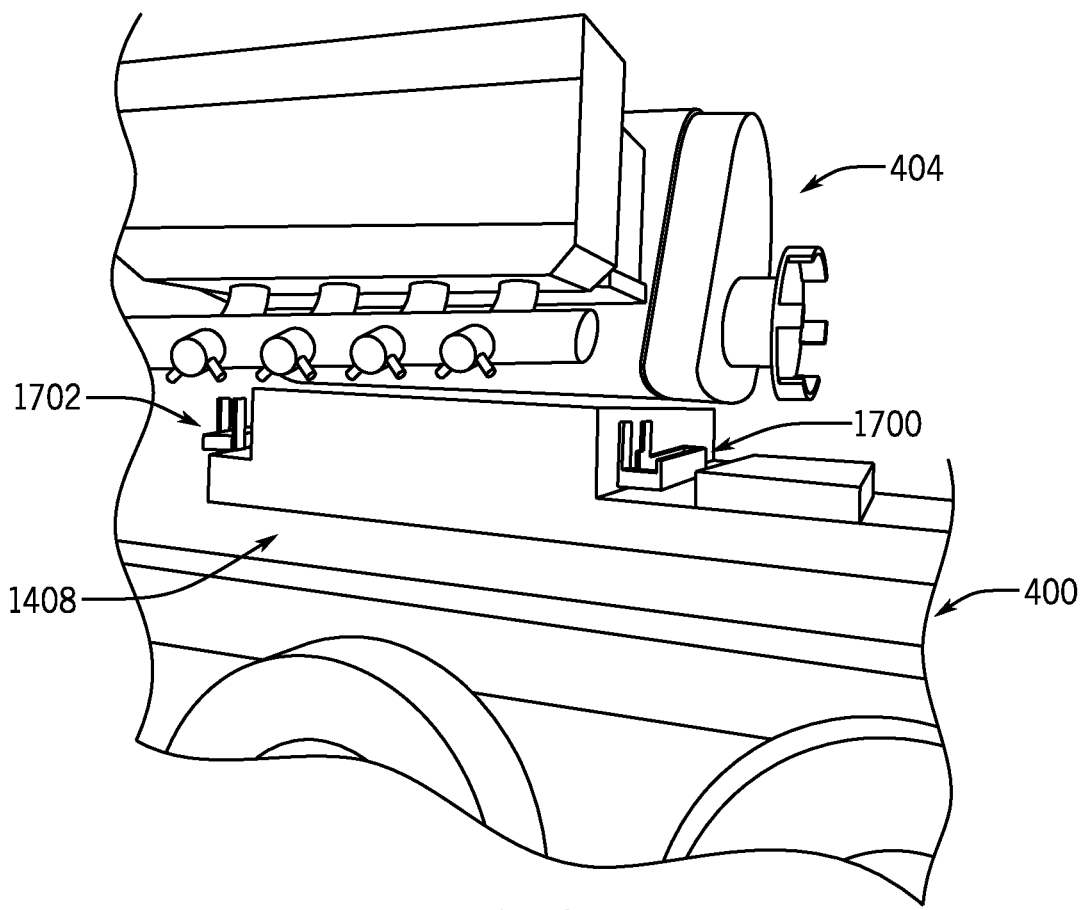
FIG. 17 is a perspective view of an embodiment of a drive system, in accordance with embodiments of the present disclosure.

FIG. 17 is a perspective view of an embodiment of the actuator bracket 1408 that includes guide rails 1700 facilitating operation of the platform 1400. The actuator bracket 1408 in the illustrated embodiment forms at least a portion of a pump platform 1702 utilized to support the pump 404. The guide rails 1700 are arranged axially lower than the pump platform 1702 and proximate the actuator bracket 1408. In various embodiments, the guide rails 1700 move axially along the pump platform 1702 in order to transition the platform 1400 between a retracted position to a deployed position.

Figure 18:
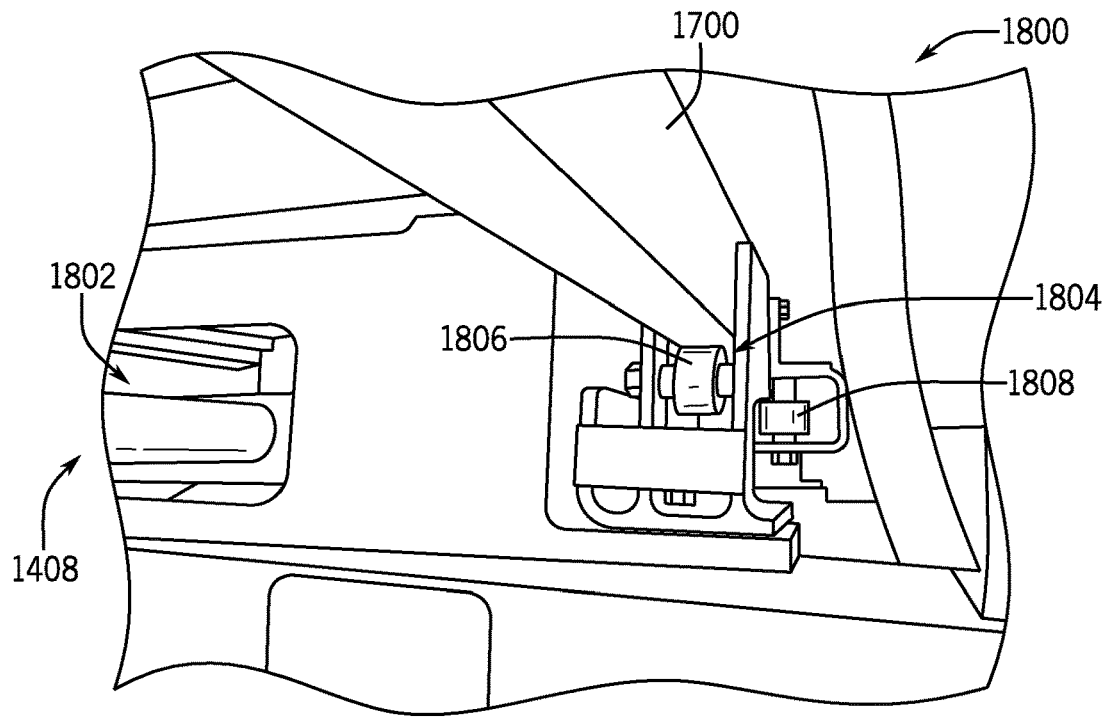
FIG. 18 is a perspective view of an embodiment of a drive system, in accordance with embodiments of the present disclosure.

FIG. 18 is a perspective view of an embodiment of a drive system 1800 utilized to transition the platform 1400 between the retracted position and the deployed position. The illustrated drive system 1800 includes a linear actuator 1802 positioned within the actuator bracket 1408. The linear actuator 1802 may provide a linear force to the guide rails 1700. The guide rails 1700 are positioned at a bracket 1804 and supported by wheels 1806, 1808. In the illustrated embodiment, the wheel 1806 is a vertical wheel and the wheel 1808 is a horizontal wheel. As a result, the risk of misalignment and/or undesirable movement may be reduced due to the restriction of movement in two axes. Accordingly, the platform 1400 is restricted to move along a single movement plane that is substantially perpendicular to a pump axis. It should be appreciated that a second vertical wheel 1806 may be included at a top of the guide rail 1700. Moreover, a second horizontal wheel 1808 may also be included on an opposite side of the guide rail 1700

In various embodiments, a floor of the platform 1400 may be coupled to the guide rails 1700. In other embodiments, the guide rails 1700 may form a skeleton of the platform 1400 and the floor may be added later, for example, by laying metal or the like over the guide rails 1700.

Figure 19:
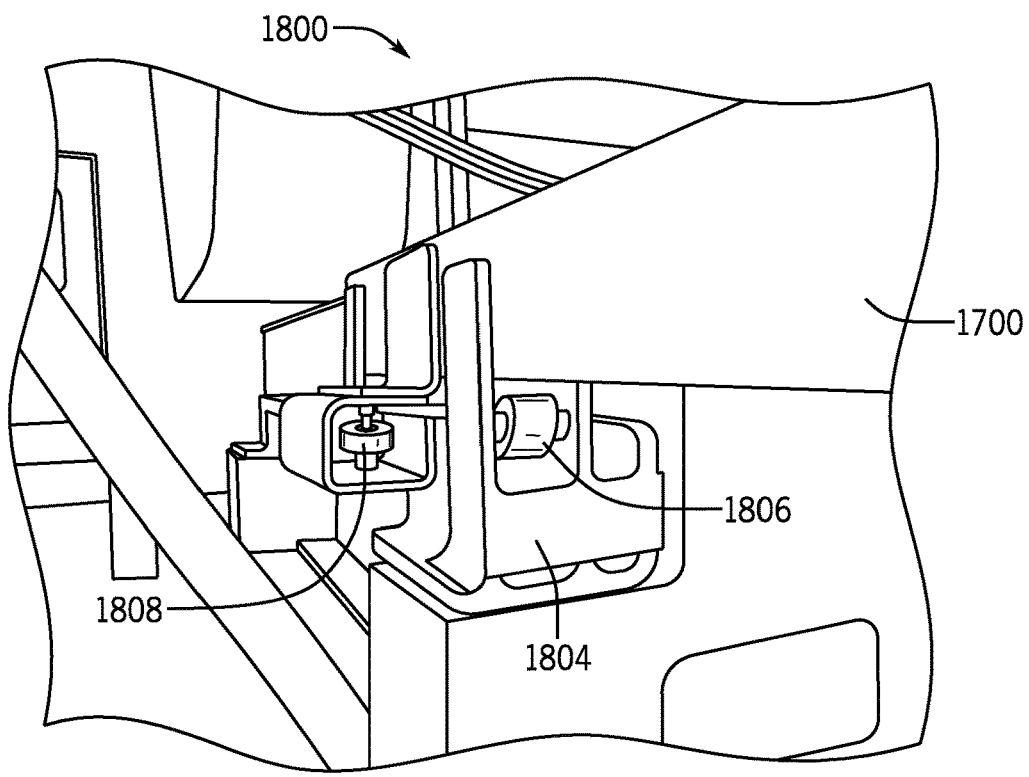
FIG. 19 is a perspective view of an embodiment of a drive system, in accordance with embodiments of the present disclosure.

FIG. 19 is a perspective view of an embodiment of the drive system 1800 including the guide rail 1700 arranged on the bracket 1804.

Figure 20:
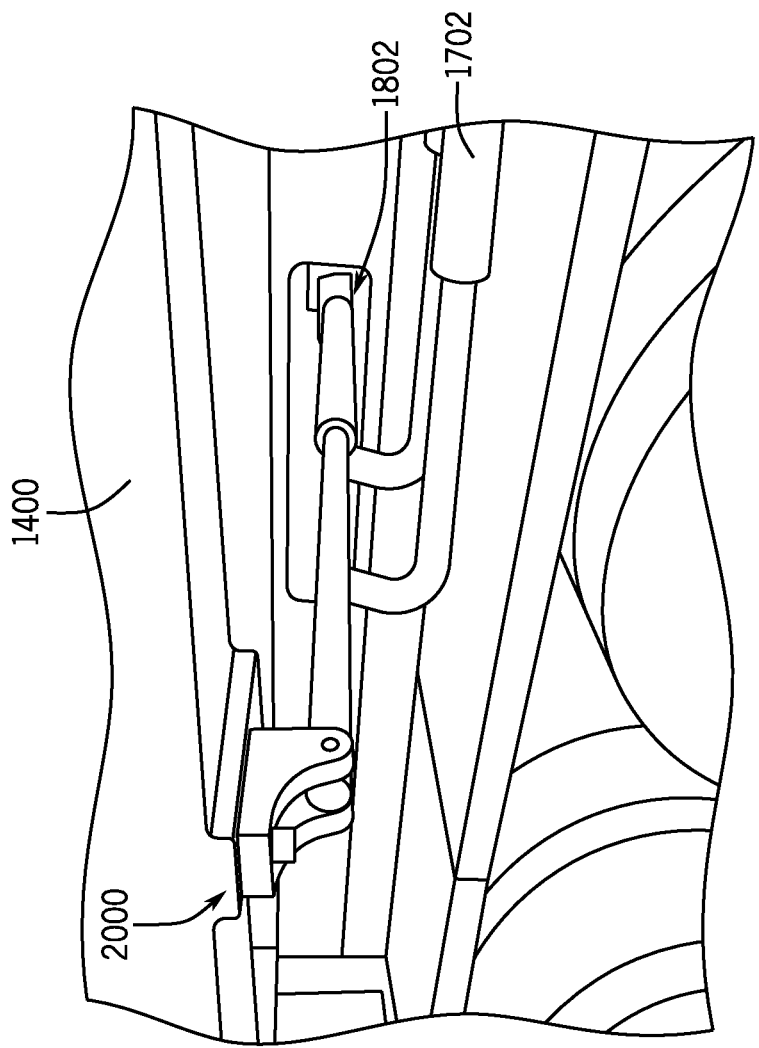
FIG. 20 is a perspective view of an embodiment of a drive system, in accordance with embodiments of the present disclosure.

FIG. 20 is a perspective view of an embodiment of the drive system 1800 including the linear actuator 1802 and a front bracket 2000 coupled to a bottom of the platform 1400. In embodiments, the other side of the bracket 2000 is attached to the pump platform 1702. In embodiments, mounting brackets may be pinned to allow a degree of freedom. The bracket 2000 coupled to the linear actuator 1802 facilitate movement of the platform 1702, as linear movement from the actuator 1802 is translated to the guide rails 1700, which enables movement between the retracted position and the deployed position.

Figure 21:
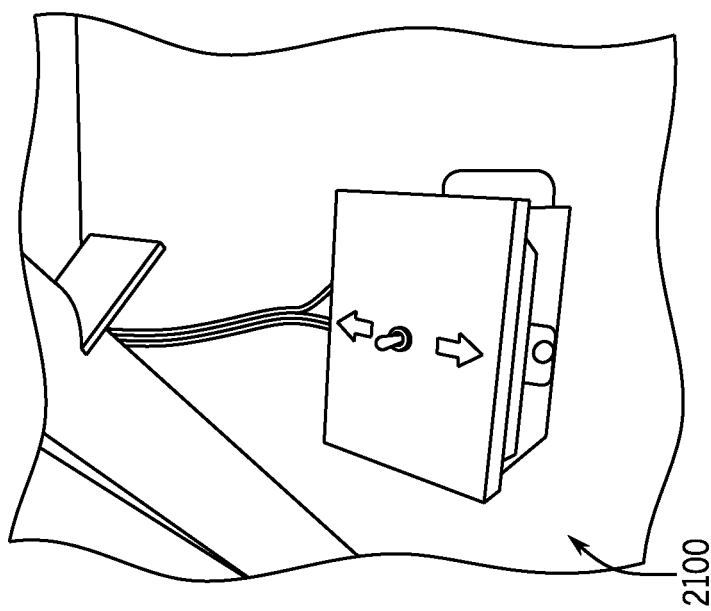
FIG. 21 is a perspective view of an embodiment of a controller, in accordance with embodiments of the present disclosure.

FIG. 21 is a perspective view of an embodiment of a controller 2100, which is illustrated as a switch in FIG. 21. The controller 2100 may be positioned proximate the platform 1400 or remove from the platform 1400. The switch may enable three-position operation of the platform 1400, for example a retracted position, an extended or deployed position, and an off position (e.g., inactive). The illustrated controller 21 includes labeling to assist operators.

As described herein, in various embodiments the pumps may be driven by electric motors. The electric motors in turn can be powered in a number of different ways, including, for example, directly from a power grid or by turbine generators. In some embodiments, the turbine generators can be natural gas turbine generators that can be configured to run on field gas or natural gas from any other source. One aspect of the present technology includes a natural gas fueling system for an electric powered hydraulic fracturing fleet.

The present technology provides a filtration and heater trailer system that allows for easy, quick fueling of turbine generators that are in turn used to power electric hydraulic fracturing fleets and other oilfield equipment. The system can include one or more of numerous advantageous features, including: the ability to run on field natural gas; the ability to run on CNG; the ability to run on LNG; the ability to connect to field natural gas, CNG, or LNG at the same time, thereby allowing fuel back up options; quickly mobile equipment; separation units to be able to process field gas; pressure regulation valves to be able to regulate field gas; high pressure regulation options; low pressure regulation options; pressure relief systems; by-pass systems; emergency shut down systems; flow meters; optional connection points to be able to add in gas compression if the field gas pressure is too low; natural gas superheat to allow the turbine to safely burn a wider variety of LHV or Wobbe index fuels; electrical connection options to the turbine to be controlled, powered, and monitored remotely; communication through wired connection such as R485 or Ethernet; wireless communication; internet or cloud connectively for remote monitoring and diagnostics Discrete parts of the system can also have many components and features that contribute to the advantages and benefits of the system. For example, the filtration conditioning trailer can include the following components and specifications: an emergency shut down (ESD) that has one or more of the following: a 6" 900 #carbon steel, process line; a 6" 900 #ESD (process gas actuated) with a manual block and by-pass; a Coriolis flow transmitter, with upstream strainer, with block and by-pass; a filter separator 6" 900 #isolation valves; and PIT—upstream and downstream of filter separator. Moreover, the conditioning trailer may include a pressure control valve station that has one or more of the following: a high pressure reduction station to include worker-monitor pressure regulators—900 #rating; a low pressure reduction station to include worker-monitor pressure regulators—300 #rating; and isolation ball valves. Additional features may include at least one separator vessel arranged as a horizontal vessel approximately 30" ID, with nozzles such as: one or more 6", 900 #RFWN (for, e.g., inlet, outlet); one or more 2" 900 #RFWN (for, e.g., handhole, drain); instrumentation ¾" to 1" SW (for, e.g., instruments, vent); flanges and couplings that can be made from SA-105, pipe that can be made from SA-106B, plate that can be made from SA-516-70, and weld cap that can be made from SA-234-WPB or SA-516-70; supports for the horizontal separator vessels that can be made from SA-36; the vessel can be ASME (American Society of Mechanical Engineers) Section VIII, Div 1 designed, code stamped, and national board registered for 1600 PSIG @250 F with ¹⁄₁₆" corrosion allowance. In embodiments, the vessel can include the following separation elements: diverter baffles; wire mesh; vane plus cyclone. The heater trailer can include various components and specifications. For example, the heater trailer may include at least one field gas filter-heater skid, each having at least some of the following components and specifications: one or more duplex filter coalescers and one or more electric heaters (including, in some embodiments, instrumentation, valves, and control panel); a flow rate of approximately 14,300 lb/hr; an operating pressure of about 250-500 psig; an operating temperature of about 50° F. superheat; a heater duty of about 115 kW at 480V; an electrical design for Outdoor Class 1, Division 2, Group D area classification.

Additional components may include at least one Filter Coalescer Vessel, which can include the following features and specifications: at least one vessel of about 14 inches diameter with nozzles that can be detailed as follows: at least one 14" 300 #RFWN nozzle (for, e.g., top chamber access); at least one 3" 300 #RFWN nozzle (for, e.g., inlet, outlet); a plurality of ¾"-1" SW nozzles (for, e.g., instruments, drains, vents); a plurality of flanges and couplings that can be made from SA-105, pipe that can be made from SA-106B, plate that can be made from SA-516-70, and weld cap that can be made from SA-234-WPB or SA-516-70, where applicable; at least one support provided for vertical vessel orientation, and that can be made from SA-36; at least one davit arm provided for the vessel main blind; the vessel can be ASME Section VIII, Div. 1 (Latest Edition) designed, code stamped, and national board registered for 600 PSIG (MAWP) at 200° F. with ⅛" corrosion allowance. In embodiments, the vessel can include at least one transcend filter element that can be made from a micro-fiber synthetic material designed for removal of about 99.9% of particles having a size of about 0.3 micron and larger. Moreover, each filter can have one carbon steel tube sheet and riser assembly and one or more 316SS Stainless Steel Tags. Furthermore, the media in coalescing elements can be rated at about 99.97% efficiency at intercepting liquid aerosols and particulate contaminants ranging in size from about 0.3 micron to about 0.6 micron in diameter. The carryover for this media grade can be less than 1 ppmw and the gas stream at the outlet of the filter/coalescer vessel can be designed to contain 0.1 ppmw or less of oil, water, or hydrocarbon liquids. Further components include at least one electric heater of about 115 KW a 480 V, 2 phase, 30 watts/sq in, each having at least one of the following components and specifications: about a 24×0.475 in diameter, 0.035 inch wall, with an Incoloy 800 Sheath; at least one high-temperature alloy spacer ring that can have individual element support; at least one type 304 stainless steel flange, which can be sized about 8 inches, and be ANSI rated to 300 lbs; at least one explosion resistant (Nema 4/7) terminal housing with a spin cover; at least one mechanical lug (4 AWG Min) integral to buss bars, for power; at least one heating element sensing duplex RTD with Inconel Sheath, Tag #TE-; at least one type 304 stainless steel spiral wound non-asbestos flexitallic gasket rated to about 300 lb; at least one type 304 stainless steel vessel—about 300 lb. rated construction; the vessel can rest vertically on a skirt; at least one insulation and jacket; at least one circulation heater chamber ASME Certified to Section VIII Division 1 with national board registration; at least one process duplex RTD in stainless steel well assembly in outlet, with at least one 1.5" 300 #RF connection, outlet temperature TE-, outlet temperature; at least one process duplex RTD in stainless steel well assembly in inlet, with at least one 1.5" 300 #RF Connection, inlet temperature shutdown, TE-; at least one 3" RFWN 300 #304SS Inlet/Outlet, 1" 304SS; and at least one Class 1 Div 2 Group C, D Area Classification.

Additional components may include at least one Control Panel Assembly, 480 V, NEMA 7, Control System, each having at least one of the following components and specifications: at least one NEMA 4/7 enclosure unpainted cast aluminum enclosure; at least one molded case disconnect switch; at least one disconnect handle door mounted with gasket; at least one thermal magnetic circuit breakers; at least one encapsulated double SCR with synchronous circuitry; at least one externally mounted extended surface heat sink assembly; at least one spring loaded three (3) pole safety magnetic contactors, rated to at least 480 Volts; at least one SCR controller board with 4-20 ma input; at least one control transformer rated to at least 240/480 V. Primary—120 V Secondary; at least one set transformer fuse—at least 2 each primary\ 1 each secondary plus ground; at least one digital dual point electronic over temperature controller, including at least one heater process over-temperature and at least one heater element over-temperature; at least one differential temperature controller (DTIC); at least one common alarm pilot light with amber lens for low/high discharge temperature and low differential temperature; at least one illuminated reset pushbutton with red lens, including at least one high heater element temperature and at least one high heater outlet temperature; at least one two position switch, "Control Power Off/On"; at least one illuminated green pilot light, "Control Power On"; at least one 24 VDC control relay for remote Off/Enable signal; at least one form "C" contact for common alarm and shutdown; at least one permissive start tag; at least one common alarm tags—high discharge and low outlet/differential; at least one common shutdown tag-high discharge, high element; at least one assembly rated for 10 kA interrupt capacity; at least one 316SS stainless steel tag; and external piping may also be included with various components of the embodiment described herein.

According to certain embodiments of the present technology, the filtration and heater trailers can communicate with each turbine as illustrated in Table 1, which provides a mapping of the inputs and outputs.

| TYPE | TAG NAME | DESCRIPTION | STATE |
|---|---|---|---|
| DO | ZDV1OPCMD | GF SEPARATOR SKID INLET SHUTOFF VALVE OPEN CMD | CLOSE ON OPEN |
| DI | ZSO_ZDV1 | GF SEPARATOR SKID INLET SHUTOFF VALVE OPEN IND | CLOSE ON OPEN |
| DI | ZSC_ZDV1 | GF SEPARATOR SKID INLET SHUTOFF VALVE CLOSED IND | CLOSE ON CLOSED |
| DO | LV1AOPCMD | GF SEPARATOR SKID SEP#1A DRAIN VALVE OPEN CMD | CLOSE ON OPEN |
| DI | ZSO_LV1A | GF SEPARATOR SKID SEP#1A DRAIN VALVE OPEN IND | CLOSE ON OPEN |
| DI | ZSC_LV1A | GF SEPARATOR SKID SEP#1A DRAIN VALVE CLOSED IND | CLOSE ON CLOSED |
| DO | LV1BOPCMD | GF SEPARATOR SKID SEP#1B DRAIN VALVE OPEN CMD | CLOSE ON OPEN |
| DI | ZSO_LV1B | GF SEPARATOR SKID SEP#1B DRAIN VALVE OPEN IND | CLOSE ON OPEN |
| DI | ZSC_LV1B | GF SEPARATOR SKID SEP#1B DRAIN VALVE CLOSED IND | CLOSE ON CLOSED |
| DO | BVD1OPCMD | GF SEPARATOR SKID BLOW DOWN (VENT) VALVE OPEN CMD | CLOSE ON OPEN |
| DI | ZSO_BVD1 | GF SEPARATOR SKID BLOW DOWN (VENT) VALVE OPEN IND | CLOSE ON OPEN |
| DI | ZSC_BVD1 | GF SEPARATOR SKID BLOW DOWN (VENT) VALVE CLOSED IND | CLOSE ON CLOSED |
| DI | LS-1A | GF SEPARATOR SKID SEP#1A LEVEL SWITCH HIGH | OPEN ON HIGH |
| DI | LS-1B | GF SEPARATOR SKID SEP#1A LEVEL SWITCH HIGH HIGH | OPEN ON HIGH HIGH |
| DI | LS2A | GF SEPARATOR SKID SEP#1B LEVEL SWITCH HIGH | OPEN ON HIGH |
| DI | LS2B | GF SEPARATOR SKID SEP#1B LEVEL SWITCH HIGH HIGH | OPEN ON HIGH HIGH |
| RTD | TE1 | GF SEPARATOR SKID HEATER EH1 INLET TEMPERATURE | 0-500 DEG F. |
| RTD | TE2 | GF SEPARATOR SKID HEATER EH1 OUTLET TEMPERATURE | 0-500 DEG F. |
| DI | DPISH1 | GF SEPARATOR SKID DIFFERENTIAL PRESSURE SWITCH | OPEN ON HIGH |
| AI | PIT1100 | GF SEPARATOR SKID INLET PRESSURE | 0-1000 PSIG |
| DO | GFHTR_EN | GF HEATER CONTROLLER ENABLE COMMAND | CLOSE ON ENABLE |

It should be appreciated that may be other inputs/outputs, such as, for example SDV-1 Shutoff Valve Permissives, including: Gas Fuel (GF) Separator Skid Inlet Supply Press<530 PSIG; Gas Separator FV-1A Level Switch LS-1B High High; Gas Separator FV-1B Level Switch LS-2B High High; and Turbine Fire Indication. Additionally, systems may include SDV-1 Shutoff Valve Auto Operation. In particular, for this operation, the Gas Shutoff Valve can automatically open on any gas turbine start and automatically close when a gas turbine stop is initiated and the cool down sequence is complete. The valve positions can change state within about 30 seconds. If any position switch fails to change state from the commanded position, the control system can be set to alarm "GF Shutoff Valve SDV-1 Position Fault". This alarm may not keep the valve from opening as long as the permissives are satisfied. The GF shutoff valve can remain latched closed until a "Software Reset" is initiated via the human machine interface (HMI). The control system can alarm indicating the event that closed the shutoff valve. The Gas Shutoff Valve can also automatically close when any of the following action occurs: Gas Fuel Separator Skid Inlet Supply Press>530 PSIG; Gas Separator FV-1A Level Switch LS-1B High High (Active); Gas Separator FV-1B Level Switch LS-2B High High (Active); Turbine Fire Indication (Active). Another example includes SDV-1 Manual Operation. The gas shutoff valve can be Opened or Closed anytime in Manual mode from the HMI when all permissives are met and the Blowdown BVD-1 is closed. The manual function can be disabled when a gas turbine start is active. It should be appreciated that the Manual Mode selection can be password protected at the HMI. The control system may alarm "Gas Shutoff Valve in Manual" when manual Open or Close commands are initiated.

Another example includes BVD-1 Auto Blowdown Valve Operation. When auto mode is selected from the HMI, the Blowdown valve can open automatically when Fire Indication is active and remain open until fire indication is clear. If any position switch fails to change state from the commanded position, the control system may alarm "GF Blowdown Valve BDV-1 Position Fault".

By way of further example, BVD-1 Manual Blowdown Valve Operation may include instructions that specify that the Blowdown valve can be opened or closed anytime in manual mode from the HMI when SDV-1 Shutoff Valve is closed. As noted above, the Manual Mode selection can be password protected at the HMI. The control system may alarm "GF Blowdown Valve in Manual" when manual open or close commands are initiated.

Another example includes GF Separator Skid Purge/Pressurize Operation. Such operation can include steps such as Selecting the Purge button on the GF Separator HMI screen. A pop-up screen may request a password. Next, a user may Enter a user name, which can be case sensitive, and password. Once entered, a window may open with message "Verify all skid vales are in the proper position." The user selects OK. This allows the Purge/Pressurize Start/Stop buttons to become active. Further included may be a Start Purge/Pressurize Sequence. For example, when Start Purge/Press button is selected, the following may occur. The Gas Skid inlet valve SDV-1 opens, and skid blow-down valve BDV-1 opens. Additionally, Stop Purge/Pressurize Sequence may be included. When Stop Purge/Press button is selected, the following may occur. The Gas Skid inlet valve SDV-1 closes, and skid blow-down valve BDV-1 closes. It should be appreciated that control logic normally does not allow for both the skid inlet valve and blow-down valve to be both open because gas-rush may damage the gas filter elements unless the filter inlet valve has been manually closed in preparation. This is why the PURGE/PRESSURIZE function may be password protected, and why confirmation of filter isolation valve positions may be implemented.

Continued examples of control operations/equipment include a LV-1A GF Separator IA Level Control Valve. In embodiments, a blow down valve may open for about 10 seconds if LS-1A High Level Switch activates. If any position switch fails to change state from the commanded position, the control system will alarm "GF Separator Level Control Valve LV-1A Position Fault". Another example is LV-1B GF Separator D3 Level Control Valve Operation. The blow down valve will open for 10 seconds if LS-1B High Level Switch activates. If any position switch fails to change state from the commanded position, the control system may alarm "GF Separator Level Control Valve LV-1B Fault". A further example is GF Heater Enable Command Operation. The GF Heater Enable command may go only when the gas turbine is operating at or above GG idle. If gas fuel temperature on TE-2 reaches 200 deg F., the heater enable command may be disabled and an alarm initiated, "Gas Heater Temp>200 Deg F.".

By way of further example, Gas Separator/Heater System General Alarms may include: Gas Fuel Separator Skid Inlet Supply Press—Signal Fail PIT1100; Gas Fuel Separator Skid Inlet Supply Press Low—PIT1100<250 PSIG; Gas Fuel Separator Skid Inlet Supply Press High—PIT1100>530 PSIG; Gas Separator 1A Level Switch High—LS-1A; Gas Separator 1A Level Switch High High LS-1B; Gas Separator 1B Level Switch High—LS-2A; Gas Separator 1B Level Switch High High LS-2B; Gas Fuel Shutoff Valve SDV-1 Position Fault; Gas Fuel Shutoff Valve SDV-1 in Manual; Gas Fuel Shutoff Valve SDV-1 Reset Required; Gas Fuel Blowdown Valve BDV-1 Position Fault; Gas Fuel Blowdown Valve BDV-1 in Manual; Gas Fuel Blowdown Valve BDV-1 Reset Required; Gas Fuel Level Control Valve LV-1A Position Fault; Gas Fuel Level Control Valve LV-1A in Manual; Gas Separator Differential Pressure Switch High DPISH-1; Gas Fuel Heater Inlet Temperature TE-1—Signal Fail; Gas Fuel Heater Inlet Temperature TE-2—Signal Fail; Gas Fuel Heater Inlet Temperature Low TE-1; Gas Fuel Heater Inlet Temperature High TE-2>200 F.

In various embodiments, the gas filtration and heater trailers may be electrically connected to an electrical power source, such as a turbine generator mobile power unit. In addition, the turbine generator can be electrically connected to switchgear and transformers. The transformers can be electrically connected to oilfield equipment such as fracturing pumps, long stroke intensifier units, blenders, hydration units, data vans, sand equipment, light plants, dry-gel units, wireline, crane, and other oilfield equipment.

Figure 22:
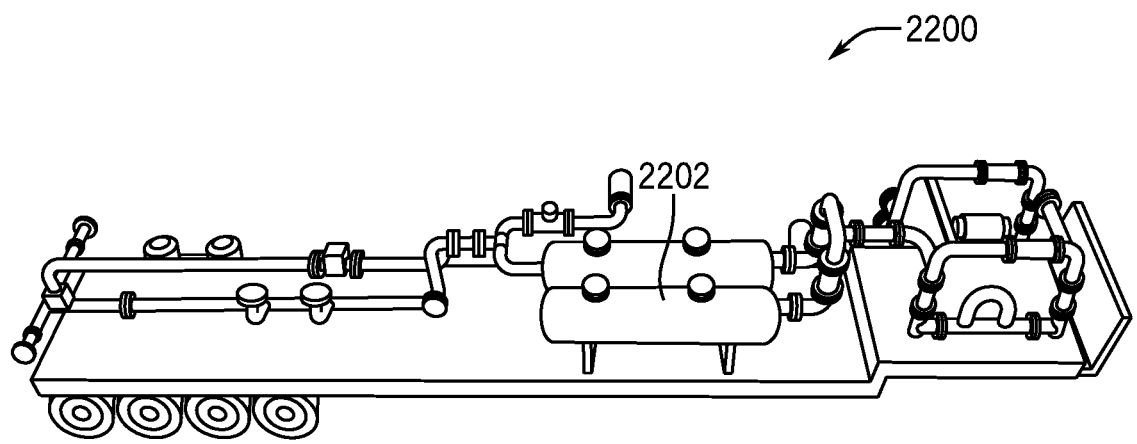
FIG. 22 is a top perspective view of an embodiment of a filtration trailer, in accordance with embodiments of the present disclosure.

FIG. 22 is a top perspective view of an embodiment of a filtration trailer 2200. As noted above, in various embodiments the filtration trailer 2200 will be described with reference to a trailer, but such description is not intended to be limiting and various embodiments may include arrangement on skids, platforms, truck beds, flatbeds, and the like. FIG. 22 includes pressure regulation, separators, and an emergency shut down flow meter. For example, vessels 2202 arranged along the trailer may facilitate separation at the wellsite, for example, to remove components from gas the well site or the like. Pressure regulation may be provided in a variety of ways, such as by throttling valves, back pressure units, and the like. Furthermore, energy shut down may be electronically provided, for example, by directing valves to open and/or close in response to a command, such as a pressure signal. In various embodiments, the gas processed by the filtration trailer 2200 may come from the same well site, offsite wells, compressor stations, CNG, and/or sales lines, among other options. Accordingly, while embodiments may be described as using gas coming from the well where the trailer is located, in various embodiments the gas is sourced from a well somewhere but not necessarily the same wellsite the turbine is set up on.

Figure 23:
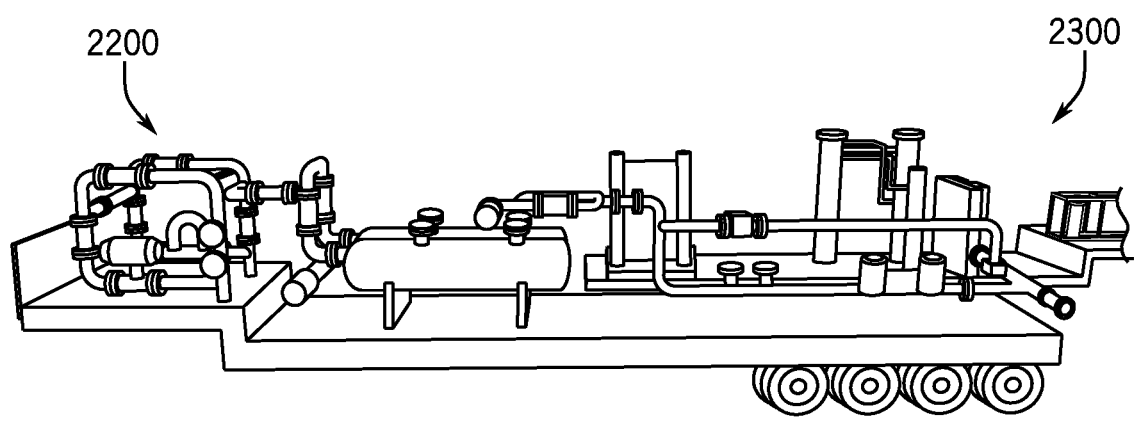
FIG. 23 is a top perspective view of an embodiment of a filtration trailer and heating trailer, in accordance with embodiments of the present disclosure.

FIG. 23 is a perspective view of the filtration trailer 2200 further illustrating a heater trailer 2300. In various embodiments, the filtration trailer 2200 and heater trailer 2300 may be integrated into a single unit, and the embodiment including the units as being separate is for illustrative purposes only.

Figure 24:
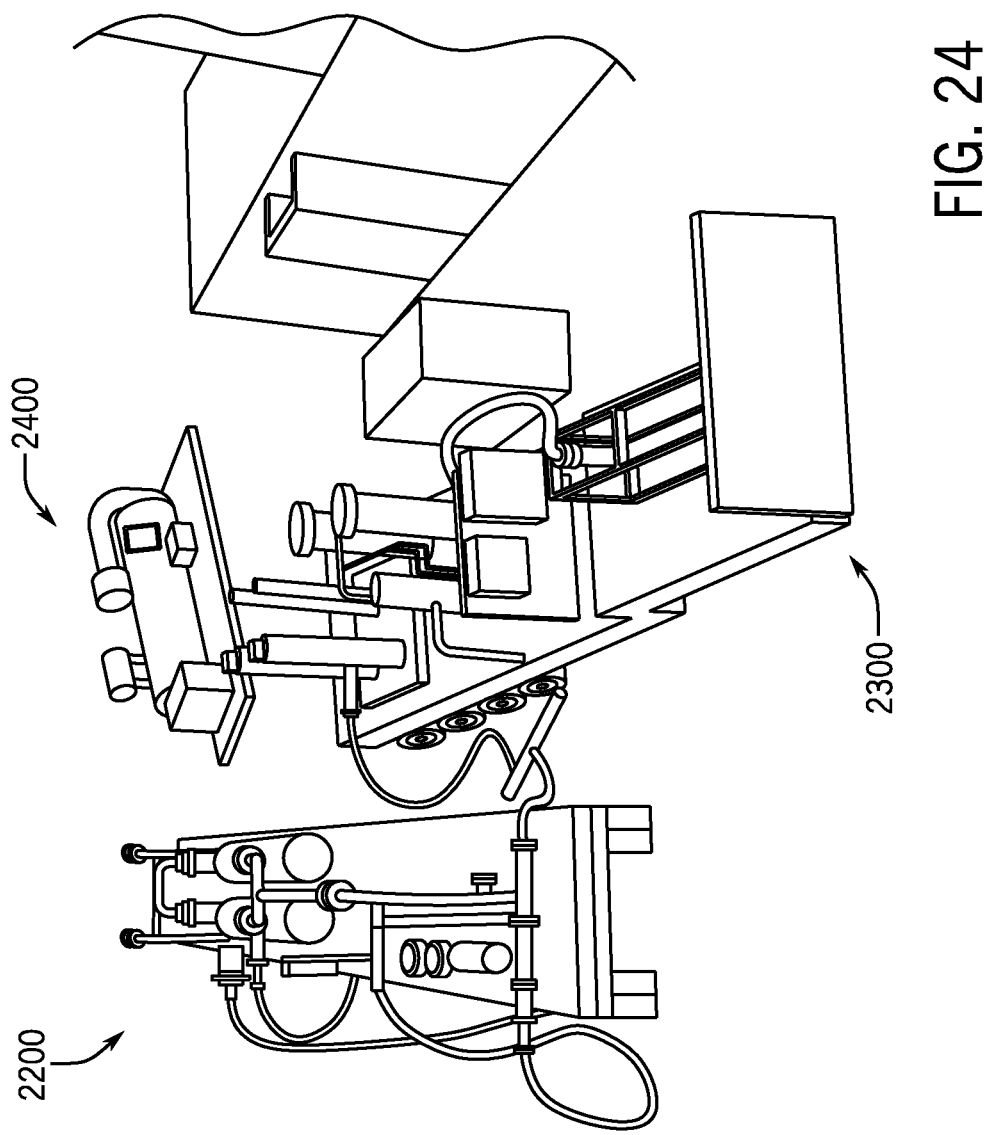
FIG. 24 is a top perspective view of an embodiment of a filtration trailer and heating trailer, in accordance with embodiments of the present disclosure.

FIG. 24 is a perspective view of an embodiment of the filtration trailer 2200, the heater trailer 2300, and a line heater 2400. As noted above, various features of each of the trailers may be combined in order to remove various particulates or components of gas, such as field gas.

Figure 25:
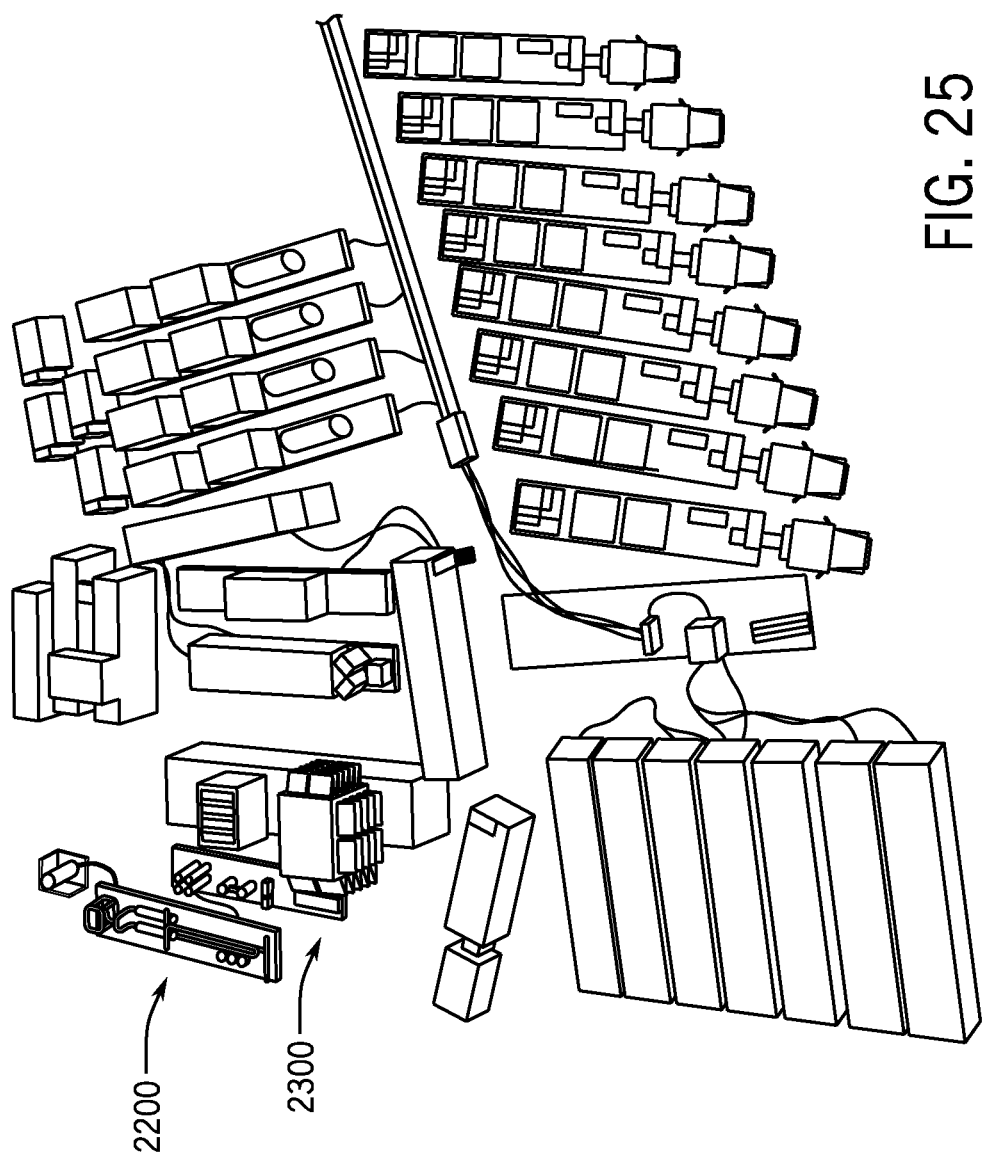
FIG. 25 is a top perspective view of an embodiment of a well site, in accordance with embodiments of the present disclosure.

FIG. 25 is a top perspective view of an embodiment of a well site that includes the filtration trailer 2200, the heater trailer 2300, and the line heater 2400. In various embodiments, the trailers are connected to a field natural gas supply. Additionally, the heaters may be connected to a turbine, such as a 30 MW and/or 5 MW turbine. The turbine generators are electrically connected to Switchgear A, which is connected to Switchgears B1 and B2. The Switchgears B1/B2 are electrically connected to electric powered fracturing pumps and the auxiliary trailer. The auxiliary trailer is electrically connected to a blender and a data van. The auxiliary trailer can also be electrically connected to sand equipment, hydration units, and other miscellaneous equipment that requires electrical power.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

The invention claimed is:

1. An electrically driven slide out platform coupled to a trailer of a hydraulic fracturing system, comprising:
    an actuator for driving movement of the slide out platform between a retracted position and a deployed position;
    at least one guide rail coupled to the platform and extending perpendicular to an axis of the trailer, the at least one guide rail being coupled to at least a portion of a pump platform; and
    at least two wheels engaging the at least one guide rail, wherein at least one wheel of the at least two wheels is a vertical wheel and at least one wheel of the at least two wheels is a horizontal wheel.

2. The electrically driven slide out platform of claim 1, wherein the actuator is powered by a DC motor, the DC motor being powered by a battery.

3. The electrically driven slide out platform of claim 1, further comprising:
    a handrail, arranged along a length of the slide out platform;
    a retention rail, the retention rail being rotatable about an axis; and
    a ladder.

4. The electrically driven slide out platform of claim 1, further comprising:
    brackets supporting the at least one guide rail.

* * * * *